United States Patent
Horns et al.

(10) Patent No.: US 11,321,012 B2
(45) Date of Patent: May 3, 2022

(54) CONFLICT RESOLUTION WITHIN SYNCHRONIZED COMPOSITE-PART-BASED DIGITAL ASSETS

(71) Applicant: Adobe Inc., San Jose, CA (US)

(72) Inventors: Roey Horns, Seattle, WA (US); Oliver I. Goldman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/291,677

(22) Filed: Mar. 4, 2019

(65) Prior Publication Data

US 2020/0117388 A1    Apr. 16, 2020

Related U.S. Application Data

(60) Provisional application No. 62/745,283, filed on Oct. 12, 2018.

(51) Int. Cl.
   *G06F 3/06* (2006.01)
(52) U.S. Cl.
   CPC .......... *G06F 3/0659* (2013.01); *G06F 3/0604* (2013.01); *G06F 3/0619* (2013.01); *G06F 3/0673* (2013.01)
(58) Field of Classification Search
   CPC .............................. G06F 3/0604; G06F 3/0619
   See application file for complete search history.

(56) References Cited

U.S. PATENT DOCUMENTS

| 8,489,549 B2 * | 7/2013 | Guarraci ................. G06F 16/27 707/612 |
| 2004/0059703 A1 | 3/2004 | Chappell et al. |
| 2004/0205539 A1 | 10/2004 | Mak et al. |
| 2004/0236798 A1 | 11/2004 | Srinivasan et al. |
| 2005/0246387 A1 | 11/2005 | McChrystal |
| 2009/0276660 A1 | 11/2009 | Griffith et al. |

(Continued)

FOREIGN PATENT DOCUMENTS

| WO | WO 2014113196 A1 | 7/2014 |
| WO | WO 2017-080428 A1 | 5/2017 |

OTHER PUBLICATIONS

Oracle, Fusion Middleware User's Guide for Oracle Business Rules, 2013 [retrieved from internet Dec. 14, 2020][<URL:https://docs.oracle.com/cd/E12839_01/user.1111/e10228/toc.htm>] (Year: 2013).*

(Continued)

*Primary Examiner* — David Yi
*Assistant Examiner* — Nicholas A. Paperno
(74) *Attorney, Agent, or Firm* — Keller Preece PLLC

(57) ABSTRACT

The present disclosure relates to a digital asset conflict resolution system that provides conflict resolution of composite-part-based synchronized digital assets. In particular, the digital asset conflict resolution system detects conflicts within composite-part-based digital assets and resolves the conflicts at a composite-part level (i.e., composite-part level) within the digital asset based on format-specific rules. In various embodiments, the digital asset conflict resolution system utilizes format-specific rules and rule sets to automatically resolve conflicts at the composite-part level within a digital asset without duplicating the digital asset and without requiring immediate user involvement.

20 Claims, 13 Drawing Sheets

(56) References Cited

U.S. PATENT DOCUMENTS

| | | | |
|---|---|---|---|
| 2011/0016091 A1 | 1/2011 | Prahlad et al. | |
| 2011/0161723 A1 | 6/2011 | Taleck et al. | |
| 2012/0254113 A1* | 10/2012 | Theroux | G06F 16/289 707/636 |
| 2013/0103786 A1 | 4/2013 | Miglore | |
| 2013/0226876 A1 | 8/2013 | Gati et al. | |
| 2014/0156663 A1 | 6/2014 | Rhyu et al. | |
| 2014/0280272 A1 | 9/2014 | Choque et al. | |
| 2014/0281809 A1* | 9/2014 | Billa | G06F 3/0619 714/764 |
| 2015/0113326 A1* | 4/2015 | Talagala | G06F 11/1441 714/24 |
| 2015/0358375 A1 | 12/2015 | Coburn, IV et al. | |
| 2016/0034433 A1 | 2/2016 | Yamat et al. | |
| 2016/0267125 A1* | 9/2016 | Tsofi | G06F 16/2365 |
| 2016/0283049 A1* | 9/2016 | Faydi | G06F 3/0482 |
| 2016/0328223 A1 | 11/2016 | Giri et al. | |
| 2016/0344771 A1 | 11/2016 | Xuan et al. | |
| 2017/0322936 A1* | 11/2017 | Davis | G06F 16/2365 |
| 2018/0129715 A1* | 5/2018 | Standefer, III | G06F 16/9535 |
| 2018/0332320 A1 | 11/2018 | Barkley et al. | |
| 2018/0373434 A1 | 12/2018 | Switzer et al. | |
| 2018/0373770 A1 | 12/2018 | Switzer et al. | |
| 2019/0266054 A1 | 8/2019 | Kumarasamy et al. | |
| 2019/0268412 A1 | 8/2019 | Kung | |
| 2019/0273729 A1* | 9/2019 | Adler | H04L 12/44 |
| 2019/0340166 A1* | 11/2019 | Raman | G06F 16/9024 |

OTHER PUBLICATIONS

Goldman, Oliver, et al. "Digital composites: Technology for creativity in a cloud-connected world." 2015 Internet Technologies and Applications (ITA). IEEE, 2015 [retrieved from internet Sep. 17, 2021][<URL:https://ieeexplore.ieee.org/stamp/stamp.jsp?arnumber=7317385>] (Year: 2015).*

Examination Report as received in GB1806343.8 dated Nov. 1, 2018.

Search Report as received in GB1806362.8 dated Nov. 8, 2018.

L. Lessig, Remix: Making Art and Commerce Thrive in the Hybrid Economy, Penguin Books, Oct. 2008.

About the Licenses, Creative Commons, [online], http://creativecommons.org/licenses/.

I. Jacobs, N. Walsh, "Architecture of the World Wide Web, vol. One", (World Wide Web Consortium), 2004 [online], http://www.w3.org/TR/webarch/.

The JSON Data Interchange Format, Geneva: ECMA International, Oct. 2013.

N. Freed, N. Borenstein, "Multipurpose Internet Mail Extensions (MIME) Part Two: Media Types", 1996 [online], http://tools.ietf.org/html/rfc2046.

M. Nottingham, "Web Linking", 2010 [online], http://tools.ietf.org/html/rfc5988.

T. Berners-Lee, R. Fielding, L. Masinter, "Uniform Resource Identifier (URI): Generic Syntax", 2005 [online], http://tools.ietf.org/html/rfc3986.

Extensible Metadata Platform (XMP) Specification: Part 1, Data Model, Serialization, and Core Properties. Adobe, Apr. 2012.

XMP, Creative Commons Wiki, [online], https://wiki.creativecommons.org/XMP.

Dropbox: Looking Inside the Protocol Behind File Synchronization, Ixia Blog, Aug. 2014 [online], http://blogs.ixiacom.com/ixia-blog/dropbox-looking-inside-the-protocol-behind-file-synchronization/.

Evernote Synchronization via EDAM, Home—Evernote Developers, Jan. 2013 [online], https://dev.evernote.com/media/pdf/edam-sync.pdf.

L. Dusseault, Ed., "HTTP Extensions for Web Distributed Authoring and Versioning (WebDAV)", 2007 [online], http://tools.ietf.org/html/rfc4918.

R. Fielding, J. Gettys, J. Mogul, H. Frystyk, L. Masinter, P. Leach, T. Berners-Lee, "Hypertext Transfer Protocol—HTTP/1.1", 1999 [online], http://tools.ietf.org/html/rfc2616.

S.Chacon, ProGit, Apress, Aug. 2009.

U.S. Appl. No. 15/630,767, May 6, 2019, Office Action.

U.S. Appl. No. 15/630,767, Nov. 25, 2019, Office Action.

U.S. Appl. No. 15/630,740, Sep. 26, 2019, Preinterview 1st Office Action.

U.S. Appl. No. 15/630,740, Feb. 5, 2020, Office Action.

Combined Search and Examination Report as received in UK application GB1911474.3 dated Jan. 20, 2020.

Examination Report as received in United Kingdom Application GB1806343.8 dated May 13, 2020.

U.S. Appl. No. 15/630,767, May 18, 2020, Office Action.

U.S. Appl. No. 15/630,740, Jun. 18, 2020, Office Action.

Intention to Grant as received in UK application GB1806343.8 dated Oct. 14, 2020.

U.S. Appl. No. 15/630,767, Oct. 7, 2020, Office Action.

Intention to Grant as received in UK application GB1911474.3 dated Jan. 15, 2021.

U.S. Appl. No. 15/630,740, Nov. 30, 2020, Notice of Allowance.

U.S. Appl. No. 15/630,767, May 5, 2021, Office Action.

Examination Report as received in Australian application 2019213367 dated Oct. 1, 2021.

Examination Report as received in Australian application 2018202510 dated Nov. 2, 2021.

Examination Report as received in Australian application 2018202512 dated Nov. 2, 2021.

U.S. Appl. No. 15/630,767, dated Nov. 5, 2021, Office Action.

Examination Report as received in Australian application 2018202510 dated Jan. 5, 2022.

Notice of Acceptance as received in Australian Application 2018202512 dated Jan. 13, 2022.

Notice of Grant as received in Australian application 2019213367 dated Feb. 24, 2022.

* cited by examiner

CONFLICT RESOLUTION WITHIN SYNCHRONIZED COMPOSITE-PART-BASED DIGITAL ASSETS

CROSS-REFERENCE TO RELATED APPLICATIONS

This application claims the benefit of and priority to U.S. Provisional Patent Application 62/745,283, filed Oct. 12, 2018. The entire contents of the foregoing patent application are hereby incorporated by reference.

BACKGROUND

The advent of computers and computer technologies has provided numerous benefits to individuals. Some of these benefits include the ability to store files on web-based servers to allow access from multiple devices or by multiple users. For example, various file management systems enable an individual, or a group of individuals, to synchronize files across multiple client devices as well as access their files on the cloud (e.g., via the Internet). Despite these and other advantages, conventional file management systems, however, still present several drawbacks.

As one example drawback, conventional file management systems often limit the ability to access a file from multiple locations, particularly if multiple individuals are trying to edit the file at more than one location. For example, conventional file management systems often prevent an individual from modifying a file at one location if the file is also being accessed in another location. Instead, the conventional file management systems limit the individual to read-only at one, or each, of the locations.

In some cases, when an individual simultaneously accesses a file from a second location, many conventional file management systems require that the individual create a duplicate copy of the file before the individual can make changes to the file. The practice of creating duplicate copies creates several problems. For example, creating a copy doubles the amount of storage needed to store the file. This includes doubling the amount of storage at each location where the files are stored. Similarly, increasing the number of file copies on client devices also increases the processing requirements needed to access, open, edit, and/or remove files.

Further, by creating copies of a file, conventional file management systems waste bandwidth transmitting file copies. For instance, when a copy is created on a client device, the client device transmits a full copy of the file to the remote storage location. Further, if the file is synchronized to additional devices, the file management system then transmits the copy of the file to each of those locations. As the size of the file increases, the amount of wasted bandwidth also increases.

As another example, creating full file copies untethers the copy from the original file. For instance, by having multiple copies of a file, an individual often becomes confused as to which file is the most current file. For example, if one or more copies of the file include modifications, an individual is left on their own to figure out which copies contain which modifications, whether to merge modifications between multiple copies, and/or whether to delete one or more copies as a duplicate or outdated version. Further, these file copies clutter up the individual's client device (e.g., multiple copies of the same file begin to appear in folders and directories). As a result, individuals are confused as to what to do with each file copy, and in some cases, incorrectly delete a file that included desired revisions.

A few more-recent systems have attempted to solve the problem of duplicate copies. However, if a file has been modified at multiple locations at the same time, these more-recent systems encounter problems with respect to conflict resolution. Indeed, these more-recent systems frequently encounter unresolvable conflicts. In response, some of these more-recent systems attempt to resolve such conflicts by merging multiple version or copies of a file together. However, this often creates a corrupted file that cannot be opened by a corresponding application. In another example, some of these more-recent systems attempt to dispose of one file version in favor of another version. This loss of data can be unreplaceable or otherwise problematic.

Additionally, some of these more-recent systems attempt to fix the unresolvable changes problem by forking the entire file (e.g., creating multiple documents) and then later asking the user which version they want to keep. This, as described above, is computationally expensive (e.g., a forked document itself needs to synchronize as well as be stored in duplicate across all devices), confusing (e.g., the user will have to figure out which parts of the two files are actually different) and complicated (e.g., the user might have to copy/paste different parts from the two documents in order to arrive at the desired resolution).

Accordingly, these along with additional problems and issues exist with regard to conventional and more-recent file management systems. Hence, there remains a need for an improvement in the area of file management.

BRIEF SUMMARY

One or more embodiments of the present disclosure provide benefits and/or solve one or more of the foregoing or other problems in the art with systems, non-transitory computer-readable media, and methods for improving conflict resolution of composite-part-based synchronized digital assets. In particular, in some embodiments, the systems and methods detect conflicts within composite-part-based digital assets and resolve the conflicts at a composite-part level (e.g., an element, properties, component, or node level) within the digital asset. Indeed, the systems and methods can utilize format-specific rules to automatically resolve composite-part conflicts without duplicating the digital asset.

To illustrate, in various embodiments, the systems and methods detect a conflict between different versions of a digital asset. Based on the detected conflict, the systems and methods traverse the hierarchy of the digital asset versions (e.g., stepping through properties, elements, components, and child nodes) to pinpoint differences at the composite-part level. For instance, upon identifying a conflict within different versions of the same composite part (e.g., component) including where the composite part is modified in one version and removed in another version, the systems and methods identify format-specific rule sets that apply to the composite part. Then, utilizing the format-specific rule sets, the systems and methods resolve the conflict at the composite-part level. If the systems and methods are unable to resolve the conflict, the systems and methods propagate the conflict higher up within the hierarchy of the digital asset until the conflict is resolved. In this manner, the systems and methods can resolve the conflict without invalidating the digital asset (e.g., rendering the digital asset unparsable or corrupt), without requiring immediate user attention, and without duplicating the digital asset.

These and additional features and advantages of one or more embodiments of the present disclosure are outlined in the description which follows, and in part will be evident from the description, or may be learned by the practice of such example embodiments.

BRIEF DESCRIPTION OF THE DRAWINGS

The disclosure describes one or more embodiments with additional specificity and detail through the use of the accompanying drawings, as briefly described below.

DETAILED DESCRIPTION

Figure 1:
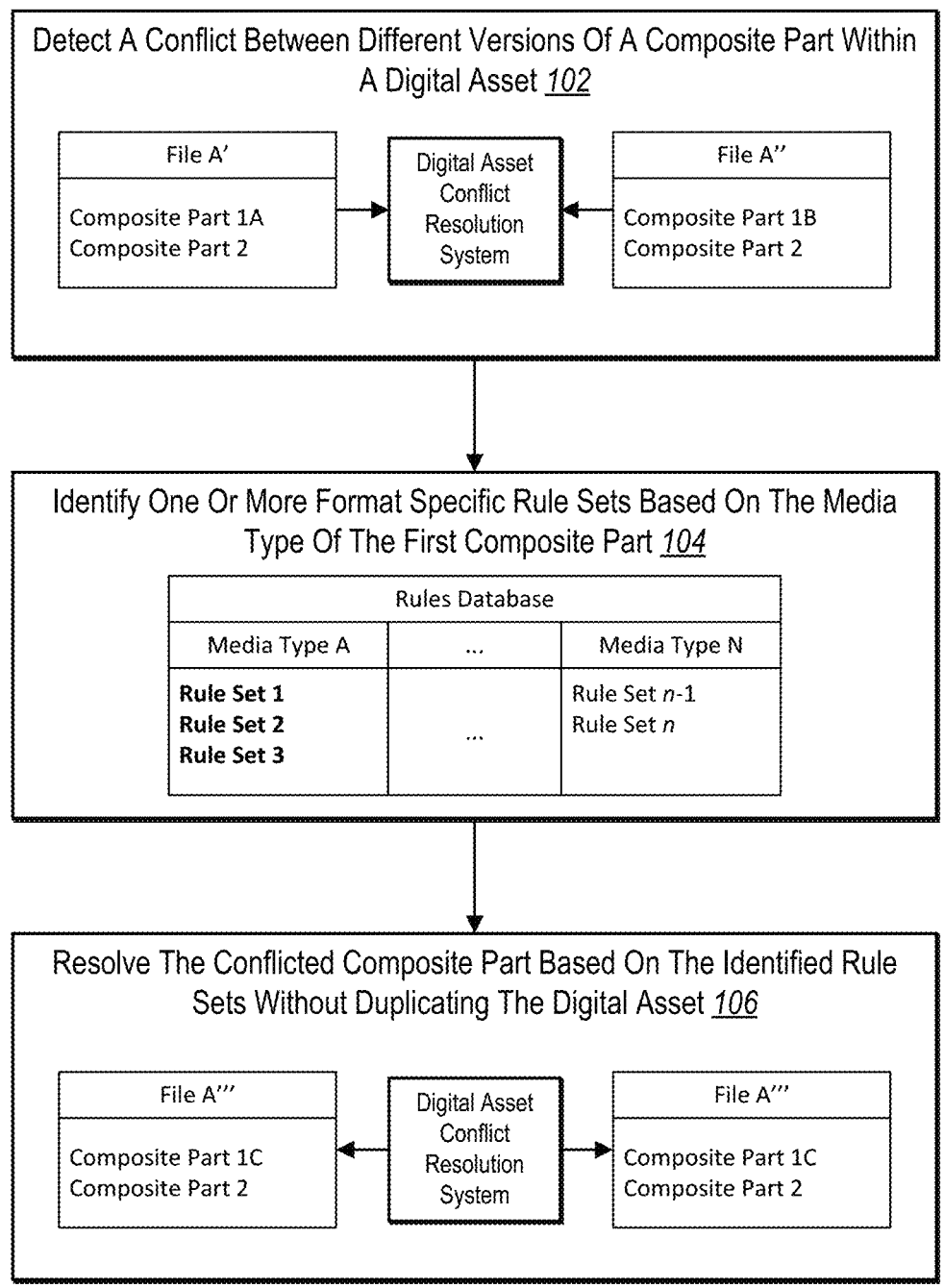
FIG. 1 illustrates an overview of detecting and resolving conflicts within a composite-part-based digital asset in accordance with one or more embodiments.

One or more embodiments of the present disclosure include a digital asset conflict resolution system that semantically, efficiently, and effectively resolves conflicts of composite-part-based synchronized digital assets. In particular, the digital asset conflict resolution system (or simply "conflict resolution system") detects conflicts within composite-part-based digital assets and resolves the conflicts at a composite-part level within the digital asset based on format-specific rules. Indeed, in various embodiments, the conflict resolution system utilizes format-specific rules to automatically resolve conflicts at the composite-part level within a digital asset without duplicating the digital asset.

To illustrate, in one or more embodiments, the conflict resolution system detects a conflict between different versions of a digital asset. Based on the detected conflict, the conflict resolution system traverses a hierarchy of the digital asset versions (e.g., stepping through the properties, elements, components, and child nodes) to identify each difference at a composite-part level. Upon identifying a conflict within different versions of the same composite part, the conflict resolution system identifies one or more format-specific rule sets that apply to the composite part. Utilizing the format-specific rule sets, the conflict resolution system resolves the semantic conflict at the composite-part level. If the conflict resolution system is unable to resolve the conflict, the conflict resolution system propagates the conflict higher up within the hierarchy of the digital asset until the conflict is resolved. In this manner, the conflict resolution system can resolve the conflict without invalidating the digital asset (e.g., rendering the digital asset unparsable or corrupt) and without duplicating the entire digital asset.

As a brief overview, a composite-part-based digital asset (or simply "digital asset") includes a composite of multiple composite parts. Each composite part includes content within a defined boundary of the digital asset and is modifiable without affecting other composite parts of the digital asset, such as a layer of an image, a page of a document, or a vector graphic of an artboard. Some composite parts are composites themselves (e.g., a composite part includes a child- or sub-composite parts). Further, a manifest can define how composite parts (e.g., components, properties, elements, and child nodes) make up a digital asset, as further described below with respect to FIG. 2. In one or more embodiments, a composite-part-based digital asset (e.g., composite-based digital asset) uses a digital composite technology ("DCX") framework.

Additionally, the conflict resolution system can synchronize digital assets across multiple devices. Once a digital asset is downloaded to a client device from a cloud-based server device, the conflict resolution system needs only to synchronize new or modified composite parts (e.g., components, properties, elements) of the digital asset. However, because a digital asset is accessible on multiple client devices or by multiple applications on the same client device, it is possible that the same composite part is modified simultaneously from different client devices, users, applications, and/or sources—resulting in conflicting composite parts (e.g., component files). Additional detail regarding detecting composite-part conflicts is provided in connection with FIGS. 3A-3C.

As mentioned above, the conflict resolution system detects conflicts and resolves these conflicts within digital assets at the composite-part level (e.g., the component level). The conflict resolution system can perform conflict detection and resolution at a client device or a server device. For example, in one or more embodiments, the conflict resolution system is located on a cloud-based server device that maintains and synchronizes digital assets. During synchronization of a digital asset, the conflict resolution system detects a composite-part conflict between different versions of a digital asset and can resolve the conflict in real-time as the digital asset is being synchronized. Indeed, the conflict resolution system can resolve semantic conflicts for digital assets in a software-agnostic manner even if a given digital asset is only accessible by a particular software application not installed on the server device. Further, the conflict resolution system can resolve conflicts inside of a background synchronization process on a client device or the server device.

To further illustrate, the conflict resolution system resolves conflicts at the composite-part level based on identifying and applying semantic format-specific rule sets (or simply "rule sets") having format-specific rules (or simply "rules"). In one or more embodiments, the conflict resolution system identifies which rule sets apply to a given composite part (e.g., a component having multiple conflicting versions) based on the composite part's media type (e.g., component file format). In some embodiments, when multiple rule sets are applicable, the conflict resolution system executes only a subset of the applicable rule sets based on rule set priority and specificity.

Upon selecting one or more applicable rules, the conflict resolution system can apply the selected rule to the conflicted composite part to achieve a resolution. In instances of a conflicted component, often the conflict resolution system writes new data into the component to effectuate the conflict resolution. Indeed, based on the media type and conflict type of a composite part (e.g., a component), the conflict resolution system understands the semantics (i.e., context) of the conflict and applies a resolution that enables the digital asset to remain a valid parsable file (e.g., the resolved digital asset conforms to the syntax rules of the corresponding software application).

In various embodiments, the conflict resolution system is unable to efficiently resolve the conflict of a component or other composite part. In these embodiments, the conflict resolution system can propagate the conflict up the hierarchy of the digital asset for resolution at a higher level. For example, in the case of a conflict of a child node, the conflict resolution system can resolve the conflict at the parent level based on rules that pertain to the parent node. In this manner, the conflict resolution system can resolve the conflict at a higher level within the digital asset, but still prevent duplicating the entire digital asset.

As described in greater detail below with respect to FIG. 5, the conflict resolution system can resolve a conflicted composite part in a variety of ways. Resolution examples include removing, merging, keeping, restoring, overriding, propagating, invalidating, or forking conflicting data between different versions of a composite part. In many embodiments, the conflict resolution system also inserts a flag, notification, or other indication to signal how a conflict was resolved. In this manner, when a user next accesses the resolved digital asset, the conflict resolution system will indicate the resolution to the user.

A digital asset can include multiple conflicts. Thus, in many embodiments, the conflict resolution system traverses different branches (e.g., conflicting versions) of a digital asset to compare each composite part (e.g., properties, elements, component, and child nodes) for differences. For each detected difference, the conflict resolution system can identify an applicable rule and resolve the conflict at the lowest divisible layer of the digital asset.

As mentioned above, the conflict resolution system utilizes semantic rules that correspond to the specific format of a component, property type, or element. As detailed in greater detail below with reference to FIGS. 6A-6B, rules are organized by format version, hierarchy, and/or type. Further, each rule includes a rule type, a condition, and a resolution action. The resolution action further includes a trigger and a resolution. In some cases, the conflict resolution system writes semantic data into a digital asset to ensure the digital asset generates a valid parsable file as part of the conflict resolution process. Additionally, the conflict resolution system maintains a set of default rules that can be applied to any composite part in the absence of the applicability of more specific rules.

As briefly described above, the conflict resolution system provides many advantages over conventional file management systems. For example, the conflict resolution system provides increased flexibility and improved computing functionality by enabling simultaneous access and editing of the same digital asset by multiple users, applications, and/or devices. Furthermore, the digital asset conflict resolution system enables simultaneous access and editing to any type of composite-part-based (e.g., modular) digital asset, rather than only a specific file type. Conventional systems and methods typically do not enable simultaneous access and editing of the same digital asset by multiple users, applications, and/or devices because of the inability to efficiently resolve conflicts across multiple types of digital assets.

In addition, the conflict resolution system enables a computing device to perform functions faster than conventional file management systems. In particular, the conflict resolution system can utilize the efficiencies gained by synchronizing only modified composite parts of a digital asset rather than synchronizing the entire digital asset. For example, when a conflict to a composite part is detected, upon resolving the conflict, the conflict resolution system resolves and synchronizes only the resolved composite part (e.g., component) rather than synchronizing duplicate copies of a digital asset. Thus, the conflict resolution system provides improved efficiencies to a client device by reducing the computing resources needed by the client device to synchronize and store a digital asset. Similarly, as an additional advantage, the conflict resolution system provides bandwidth-efficient synchronization between devices such that only a fraction of a digital asset is transmitted when a conflicted composite part is resolved.

Moreover, as mentioned above, the conflict resolution system provides improved flexibility by enabling the conflict resolution system to operate with a range of digital assets, regardless of their type (e.g., images, documents, presentations, videos, animations, infographics, and other media types). Additionally, the conflict resolution system improves computational flexibility by resolving composite-part conflicts on a semantic level rather than only a syntactic level. Indeed, conventional systems that attempt to solve conflicts at a syntactic level at limited to text-based files and/or often create a corrupted digital asset that cannot be opened by a corresponding application and/or result in the loss of data.

Further, the conflict resolution system provides the benefit of automatically detecting and resolving conflicting versions of a digital asset without the immediate involvement of the authoring application or a user. In this manner, the conflict resolution system can flexibly be utilized at any on any device (e.g., a client device and/or a server device). Furthermore, the conflict resolution system provides flexibility by allowing a resolution to occur any time, which enables users to make changes to digital assets in an offline environment and resolve conflicts upon the user synchronizing their changes at a later date.

Additional advantages and benefits of the conflict resolution system will become apparent in view of the following description. Further, as illustrated by the foregoing discussion, the present disclosure utilizes a variety of terms to describe features and advantages of the conflict resolution system. For example, the term "digital asset," as used herein, generally refers to digital data having a corresponding right to use. For instance, a user is authorized to create, view, modify, and/or delete a digital asset. Examples of digital assets include, but are not limited to, files such as documents (e.g., documents, spreadsheets, and presentations); electronic messages; images (e.g., illustrations, animations, and photographs); videos; audio content; three-dimensional data; and other digital data that a user can transmit between computing devices.

Further, the term "composite-part-based digital asset" (or simply "digital asset") includes a composite of multiple composite parts. Examples of composite parts include, but are not limited to, properties, elements, components, and child nodes. In various embodiments, the digital asset includes a manifest that identifies each composite part that makes up the digital asset as well as the arrangement of the composite parts with respect to each other. In addition, a digital asset forms a tree-like hierarchy (or any structured graph) of composite parts arranged according to properties, components, and child nodes. An example of a digital asset, manifest, and tree-like hierarchy is provided below with respect to FIG. 2.

As used herein, the term "component" refers to a portion of a digital asset. A set of components primarily makes up a digital asset including versions of the digital asset (e.g., composite-part-based digital asset). In general, each component of a digital asset is an independent file that is modifiable without affecting other components of the digital asset. In some instances, however, a limited number of components are linked, and changes to one component affect other components. Further, components can themselves be composite formats to include sub-components (e.g., a table in a document application that includes a vector graphic native to an illustration application, or an image from an image application embedded into a page of a layout application).

In addition, the style (e.g., framework) of a component is often based on boundaries within a digital asset and/or based on the digital asset's type. For example, a digital image asset includes layers and sub-layers as components; a digital video asset or video project digital asset includes shorter video segments, titles, and static graphics as components; a digital document asset includes pages, canvases, artboards, bitmaps, vector graphics, text and image boxes, rows, columns, and/or graphics as components; and a three-dimensional model digital asset includes meshes, maps, scenes, and skins as components. In other cases, a user can select the boundaries/parameters for components of a digital asset.

As mentioned above, each component is associated with an independent file. As used herein, the term "independent file" generally refers to digital data individually recorded in a storage medium. As such, one file can be accessed, modified, transmitted, and/or removed separately from other data files. Because components are discrete portions of a digital asset, each component can be stored on a computing device as an individual file, in a file location or directory that is not dependent on where other components of the digital asset are stored. Thus, in contrast to a monolithic file, which stores all data belonging to the file in a single location, components of a digital asset can be stored as files distributed across a storage medium (e.g., a local database or cloud storage), such as on one or more client devices and/or remote server devices.

The term "format-specific rule" (or simply "rule") refers to instructional data to aid in the detection and resolution of conflicts. In particular, the term "rule" includes a string of text that assigns actions to specific composite parts or objects (properties, components, or nodes) of a digital asset. As detailed in connection with FIGS. 6A-6B, rules can include a rule type, a condition, and a resolution action. The resolution action further includes a trigger and a resolution. Further, rules can be organized by format version, hierarchy, and/or type. In various embodiments, rules are stored in a specific format, such as domain specific language ("DSL"). Further, rules for a specific media type format or a group of related formats can be grouped into a rule set.

A "format-specific rule set" (or simply "rule set"), as used herein, is a collection of related rules. For example, a rule set is an encoded text file with a specified extension and rule type. In addition to rules, a rule set can include a header section that defines a rules format version, media type, and rule set name. In various embodiments, each rule in a rule set corresponds to the same one or more media types specified in the header section of the rule set. In some embodiments, a rule set is organized by rule specificity, where more specific rules for a particular media type and/or condition is ordered before (or after) more generic rules for the same media type and/or condition.

Figure 3A:
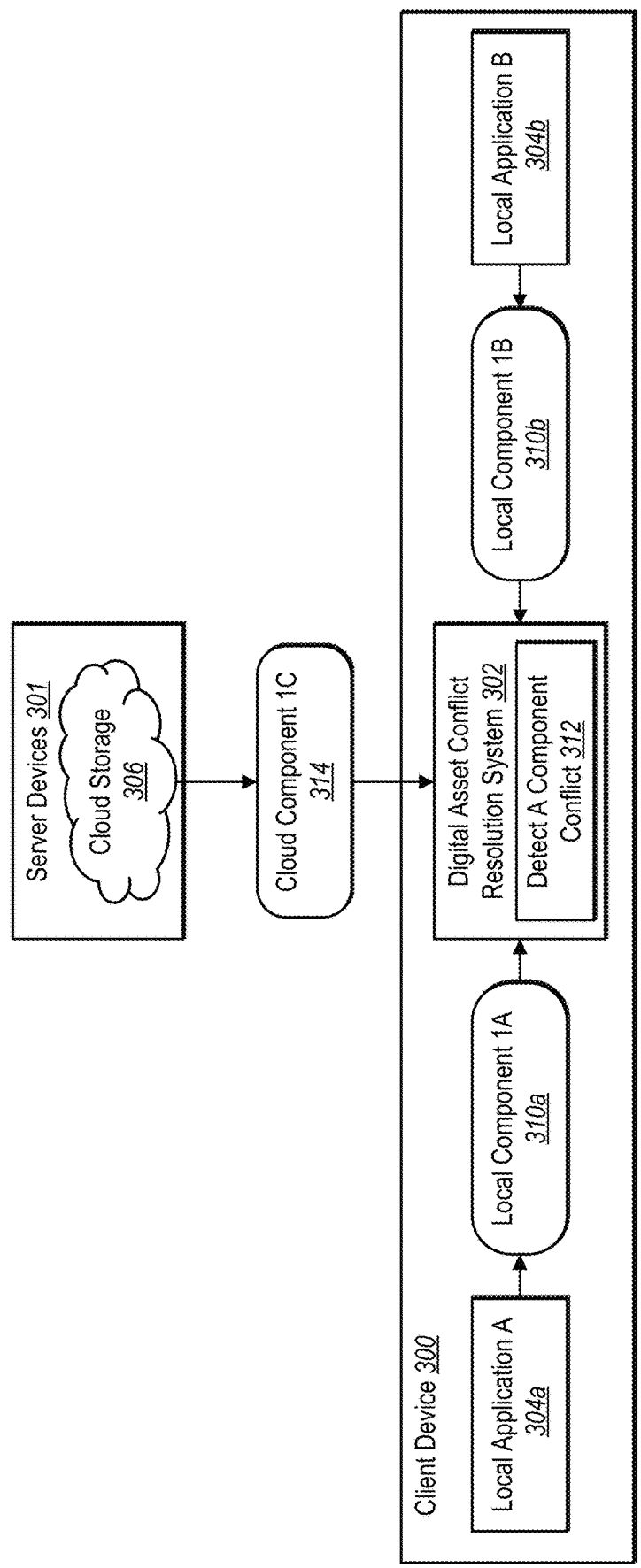
FIGS. 3A-3C illustrate example schematic and sequence diagrams of detecting conflicts within a composite-part-based digital asset in accordance with one or more embodiments.
Figure 3B:
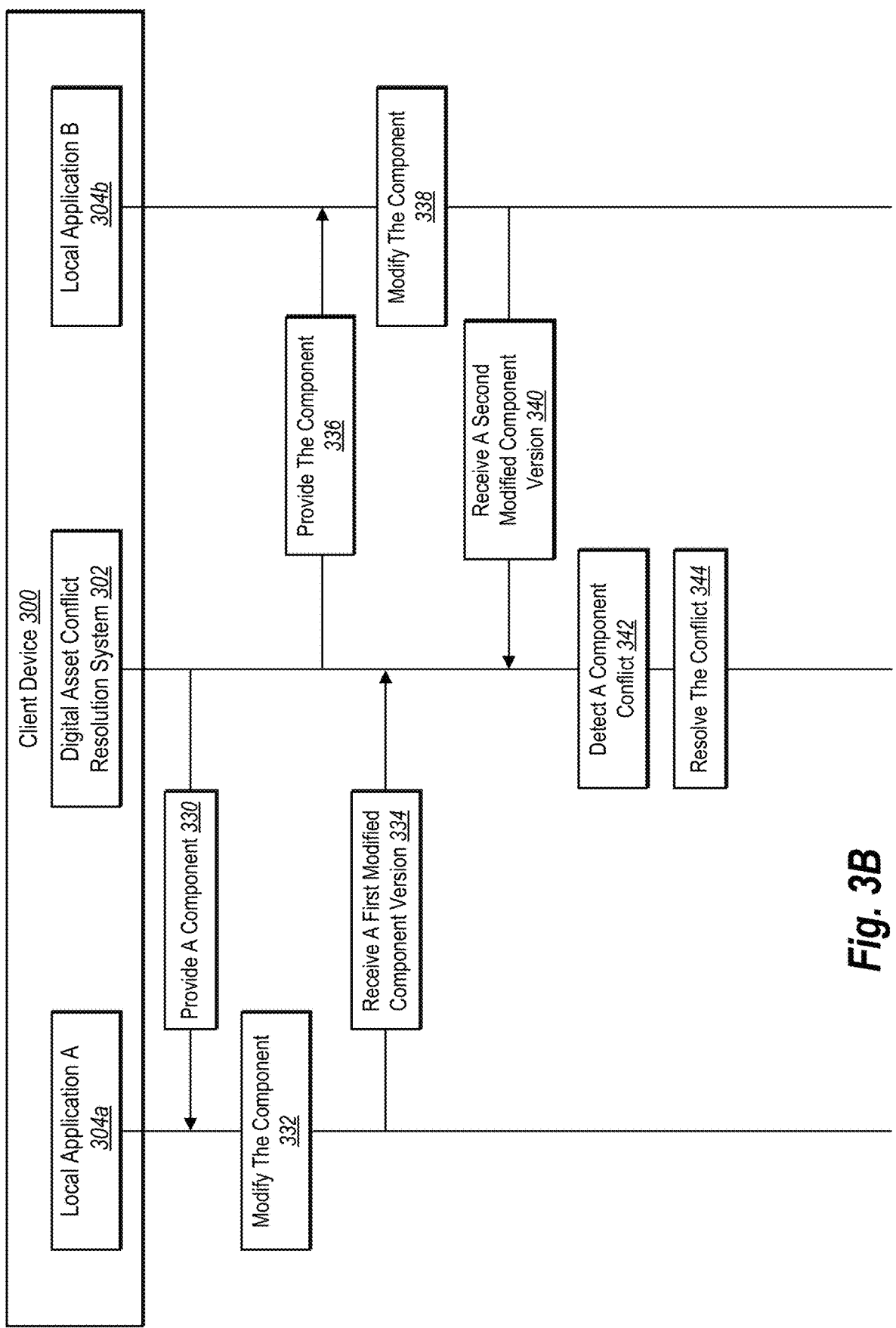
Figure 3C:
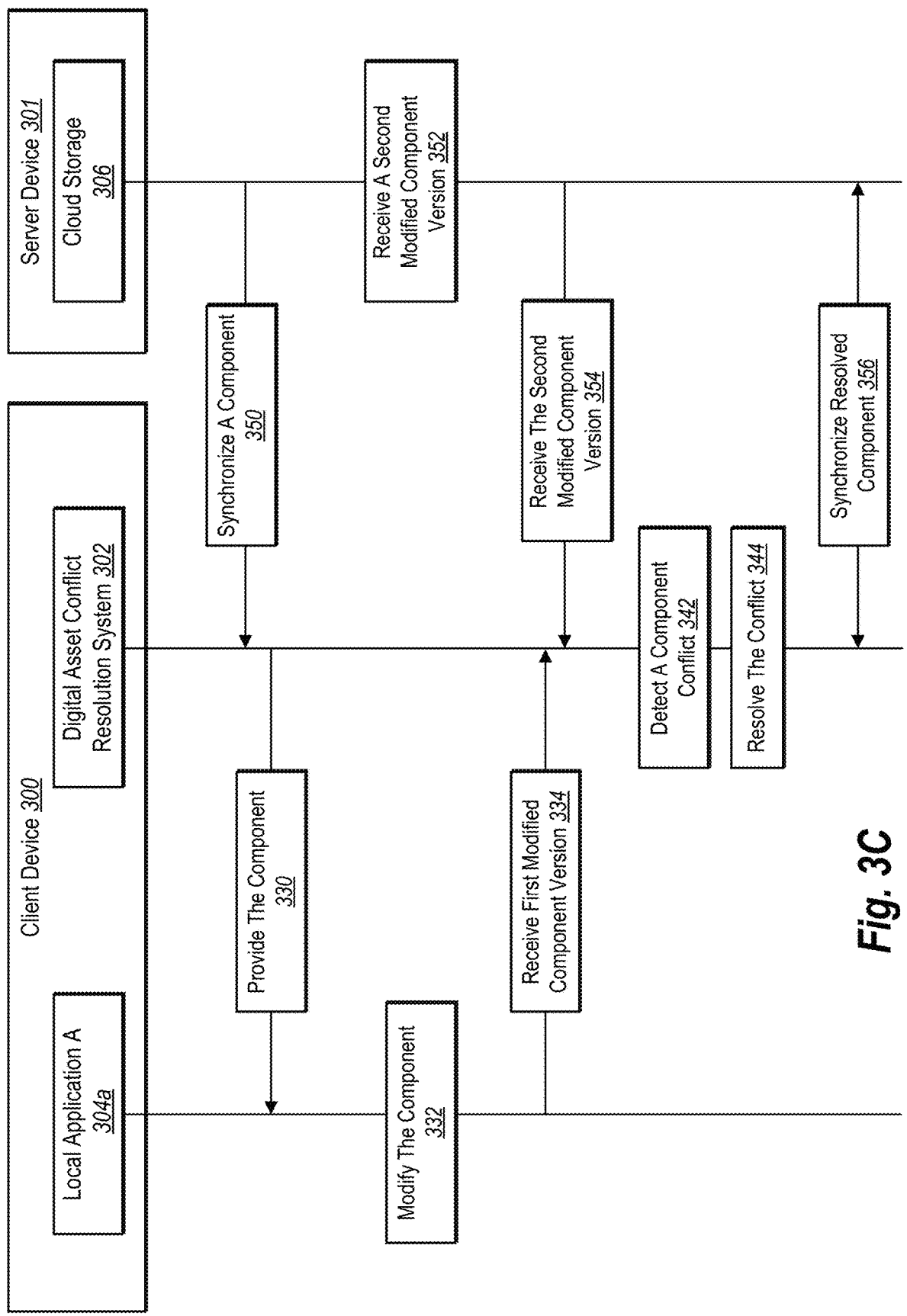

As used herein, the term "conflict" refers to a difference between versions of a digital asset or a portion thereof. For example, the conflict resolution system detects a conflict when two versions of the same digital asset are not the same or equal. In some cases, the conflict resolution system detects more than two unequal co-existing versions of the same digital asset (e.g., the original version, a first modified version, and a second modified version). FIGS. 3A-3C below provide additional details for detecting conflicts of a digital asset and/or composite parts of a digital asset.

Referring now to the Figures, FIG. 1 illustrates an overview of detecting and resolving conflicts within a composite-part-based digital asset in accordance with one or more embodiments. As illustrated, FIG. 1 includes a series of acts 100 that the conflict resolution system can implement to detect and resolve a conflict. In one or more embodiments, the conflict resolution system is located on a server device and implements the series of acts 100 as part of synchronizing digital assets across client devices. In some embodiments, the conflict resolution system is located on a client device.

The series of acts 100 includes an act 102 of detecting a conflict between different versions of a composite-part within a digital asset. As shown, the conflict resolution system (i.e., the digital asset conflict resolution system) can identify multiple concurrent versions of a digital asset. In some embodiments, the conflict resolution system initially identifies different concurrent versions of the same digital asset from two sources. In these embodiments, the conflict resolution system can traverse the properties, components, and child nodes to identify differences between the two versions.

Additionally, or in the alternative, the conflict resolution system identifies different concurrent versions of the same composite-part within the different versions of the digital asset. To illustrate, FIG. 1 shows File A' having Composite-Part 1A and Composite-Part 2 and File A" having Composite-Part 1B and Composite-Part 2. Here, the conflict resolution system determines that Composite-Part 1A of File A' conflicts with Composite-Part 1B of File A". For example, a user modified Composite-Part 1 at a first source to generate Composite-Part 1A and a user separately modified Composite-Part 1 at a second source to generate Composite-Part 1B.

The series of acts 100 also includes an act 104 of identifying one or more format-specific rule sets based on the media type of the first composite part. In particular, upon determining the conflict between different versions of Composite-Part 1, the conflict resolution system identifies the media type (e.g., component file format) of Composite-Part 1. Then, the conflict resolution system identifies applicable rule sets that correspond to the media type of the composite part. As shown in FIG. 1, the conflict resolution system identifies Rule Sets 1-3 storing rules that correspond to Media Type A.

Further, as shown, the series of acts includes an act 106 of resolving the conflicted composite part based on the identified rule sets without duplicating the digital asset. In various embodiments, the conflict resolution system utilizes the identified rule sets to determine how to resolve the conflicted composite part versions. For example, the conflict resolution system merges or forks the two modified versions of Composite-Part 1 (i.e., Composite-Part 1A and Composite-Part 1B). Alternatively, the conflict resolution system replaces, selects, or deletes one of one of the modified versions of Composite-Part 1. Additional detail regarding resolving conflicts using rule sets is described below with respect to FIG. 5.

Upon resolving the conflicted composite part, in various embodiments, the conflict resolution system can synchronize the resolved composite part to corresponding client devices (and/or applications). For instance, if two client devices provided the different modified versions of Composite-Part 1 (e.g., Composite-Part 1A and Composite-Part 1B), the conflict resolution system provides the updated Composite-Part 1C to the two client devices. If the conflict resolution system is located on a client device, the conflict resolution system can synchronize the updated Composite-Part 1C to a server device. As mentioned previously, the conflict resolution system need not synchronize the entire updated digital asset, but just the portions of the digital asset that have been updated (e.g., Composite-Part 1C).

In some instances, the conflict resolution system cannot resolve the conflict at the composite-part level. However, to maximize efficiency, the conflict resolution system need not duplicate or fork the entire digital asset. To illustrate, when confronting an unresolvable conflict at a component level, the conflict resolution system forks only those parts of the digital asset that contains the unresolvable conflict. For instance, if the conflict resolution system detects a digital asset having a base version of a given component with a blue background, a first modified version of the given component with a yellow background, and a second modified version of the given component with a green background (e.g., one user changed the given component from blue to yellow while another user changed the given component from blue to green), the conflict resolution system can fork only the given component so that the resolved digital asset contains two versions of the given component—one version with a yellow background and another version with a green background.

In this manner, the conflict resolution system need only synchronize the two modified versions of the given component across the various client devices rather than fork and synchronize two different modified versions of the entire digital asset. Further, the conflict resolution system still resolves the conflict in a manner that is apparent to users. For example, the user next accessing the resolved digital asset can easily see a yellow background version and a green background version within the digital asset and decide if one version should be kept over the other.

Figure 2:
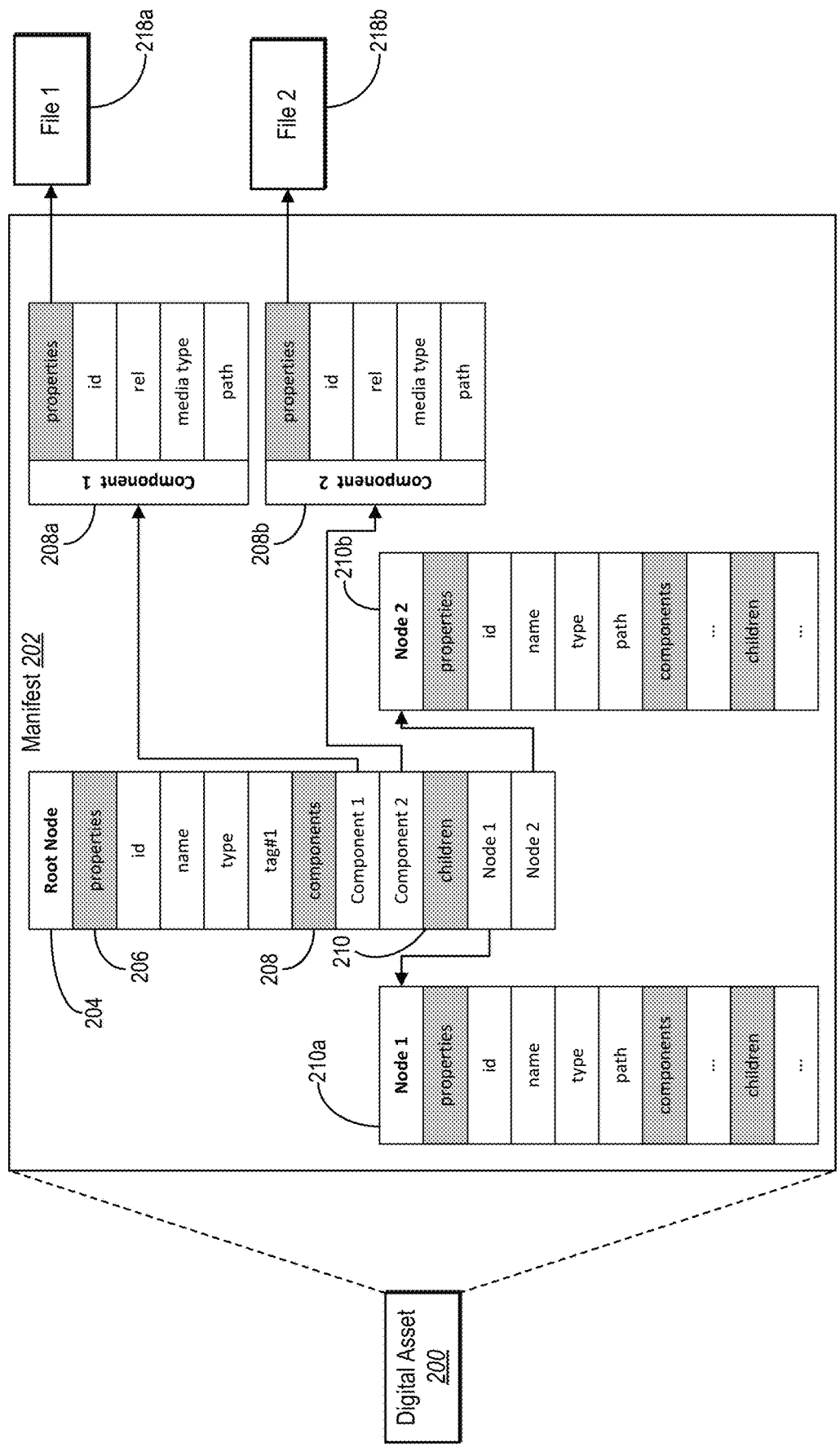
FIG. 2 illustrates an example manifest showing composite parts of a digital asset in accordance with one or more embodiments.

As mentioned above, a digital asset can include multiple composite parts. To illustrate, FIG. 2 provides additional detail regarding the structure of a digital asset (i.e., a composite-part-based digital asset). As shown, the digital asset 200 is defined by a manifest 202 (i.e., a composite-part manifest). In some embodiments, the manifest is a file or list that includes composite parts such as properties, components, and child nodes organized into a tree-like structure. For instance, the manifest 202 is a JSON file that models the structure of the digital asset 200 in a hierarchy of nodes. In alternative embodiments, the manifest is organized as another type of structured graph.

In many embodiments, the hierarchy of a manifest follows an internal structure. For example, a sketchbook is organized into page components, and an image may be composed of a hierarchy of layer components. In addition to the order of components, the internal structure is often also encoded with child nodes (i.e., Node 1 and Node 2). The child nodes can inherit many of the property attributes of the root node (i.e., parent node).

As shown, each of the nodes includes properties, components, and optionally child nodes. For example, the root node 204 includes a properties array 206, a components array 208, and a child node array 210. The properties array 206 includes metadata attributes that define a node. For example, the properties array 206 includes metadata attributes such as an identifier ("id"), name, media type, and tags. Each attribute is assigned one or more values. To demonstrate, the identifier property attribute can serve as a unique identifier of the root node. For instance, the conflict resolution system can utilize the values of the identifier property attribute to determine if two digital assets correspond to each other.

The properties array 206 can include any number of property attributes in the root node 204, including optional property attributes. Examples of property attributes include name, type, type version, creation date, modification date, tags, manifest format version, state, and units. In more detail, the name provides a user-readable name for the digital asset 200. The type includes the content types indicating that the digital asset 200 is a composite of components and/or other composite parts. The type version indicates the current version of the type, as types can change over time. The created and modified attributes indicate the creating date and modification date of the digital asset 200. The tags (i.e., tag #1) provide organization and identification of the digital assets and/or components. In addition, the manifest format version indicates the manifest's own version number (which may differ from the digital asset's version number). The state indicates information stored by the manifest 202 about its own current state and, by extension, the state of embedded composites.

The components array 208 includes which components are included in the digital asset 200. As shown, the root node 204 includes Component 1 208a and Component 2 208b. Each component can be associated with an independent file (e.g., File 1 218a and File 2 218b). To elaborate, if the digital asset 200 is an image, the components can correspond to layers within the digital asset 200 where each layer is stored separately on a client device and/or cloud-based server device. Indeed, components represent the individual files that make up the digital asset and their file locations are indicated within the manifest 202.

Each component can include individual property arrays, as shown. Examples of property attributes for a component include the identifier ("id"), name, path, media type, and relationship ("rel"). In more detail, the name is a user-readable descriptor of the component. In various embodiments, the path indicates a relative (unique) address of the component from the root node 204 of the digital asset 200. In some embodiments, the conflict resolution system utilizes the path when resolving links (e.g., URLs) that refer to other components. The media type indicates the media type of the component. The relationship attribute indicates the relationship of a component to the manifest structure. Further, the properties array of a component may include additional attributes based on the media type of the component. For example, additional attributes include a timestamp, length, width, height, pixel density, and links.

As mentioned above, the root node 204 includes the child nodes array 210. The child nodes array 210 lists which child nodes, if any, make up the digital asset 200. As shown, the manifest includes two child nodes (i.e., Node 1 210a and Node 2 210b). Each of the child nodes can include similar elements to the root node 204, such as property attributes, components, and further child nodes (e.g., grandchild nodes). In this manner, each of the child nodes in the child node array 210 can serve the same function as a single component. In addition, the child nodes inherit many of the property attributes of the root node 204. Further, unlike the root node 204, each of the child nodes includes a relationship property attribute that serves to indicate the relationship of a node to the root node 204 and/or its sibling nodes.

In additional embodiments, the root node 204 and/or the child nodes can also include one or more elements. An element is a special node that can have a different media type from the node in which the element resides (e.g., an embedded composite). For example, if a node of Media Type A includes an embedded element of Media Type B, then the conflict resolution system can utilize different rules (in the same or different rule set) when resolving a conflict within the element that is appropriate to the media type of the element. Indeed, when encountering an element during conflict resolution, the conflict resolution system can automatically switch the rule sets to utilizes rules specific to the element.

While the following description primarily describes conflicts in terms of component conflicts, conflicts can arise between properties and child nodes. The actions and methods described herein with respect to the conflict resolution system 302 resolving component conflicts can be applied to resolving property and/or child node conflicts. For example, the conflict resolution system 302 utilizes a rule set that resolves conflicts between property attributes detected between two different versions of a root node. In another example, the conflict resolution system 302 detects and resolves a conflict between different elements within corresponding nodes of the different versions of a digital asset (e.g., the element is modified in one version and deleted in the other version).

Turning to the next set of figures, additional detail is provided regarding the digital asset conflict resolution system detecting conflicts in a variety of scenarios. In particular, FIGS. 3A-3C illustrate a schematic and sequence diagrams of detecting conflicts within a digital asset in accordance with one or more embodiments. In particular, FIG. 3A illustrates how a conflict resolution system (i.e., digital asset conflict resolution system) can detect component conflicts caused by one or more computing devices (client device and/or a server device). FIG. 3B provides additional detail regarding the conflict resolution system detecting a local component conflict caused by different sources (e.g., applications) on a client device. FIG. 3C provides additional detail regarding the conflict resolution system detecting a remote component conflict caused by different devices (e.g., between a client device and a server device).

As illustrated, FIG. 3A includes a client device 300 and a server device 301. The client device 300 includes the digital asset conflict resolution system 302 (or simply "conflict resolution system 302"), a Local Application A 304a and a Local Application B 304b. The server device 301 includes cloud storage 306 of digital assets.

In general, a component conflict arises when the conflict resolution system 302 detects two independently modified versions of a composite part (e.g., a component). FIGS. 3A-3C discuss resolving a conflict between conflicting components for easy of explanation. One will appreciate that the conflict resolution system 302 can resolve conflicts between any composite parts (e.g., nodes, properties, elements).

Often, when the conflict resolution system 302 detects a single modified version of a component, a conflict is not present as the conflict resolution system 302 replaces the previous version with the modified version. However, in some instances, as described below, a single modified version can cause a conflict if the component version being replaced is not the previous version from which the modified version is based.

To illustrate, FIG. 3A shows a local component conflict scenario where the conflict resolution system 302 can detect 312 a component conflict between two local modified versions of a component (i.e., Local Component 1A 310a and Local Component 1B 310b). The local component conflict often occurs when two applications access and modify the same component. For instance, Local Application A 304a and Local Application B 304b provide different modified versions of Component 1 to the conflict resolution system 302, which then detects a component conflict between the two local modified versions. Additional detail regarding the local component conflict scenario is provided with respect to FIG. 3B.

FIG. 3A also shows a remote component conflict scenario where the conflict resolution system 302 can detect a component conflict between a locally modified version and a remote modified version of a component (i.e., Local Component 1A 310a and Remote Component 1C 314). The remote component conflict often occurs when two client devices modify the same component before each device can synchronize with the other (via the central server device 301). For instance, both the client device 300 and another client device which has synced with the cloud storage 306 on the server device 301 each provide different modified versions of Component 1 to the conflict resolution system 302. As a result, during synchronization, the conflict resolution system 302 detects a remote component conflict between the two modified versions. Additional detail regarding the remote component conflict scenario is provided with respect to FIG. 3C. As mentioned above, FIG. 3B illustrates a sequence diagram of the conflict resolution system 302 detecting a local component conflict. As shown, FIG. 3B includes the client device 300 having the conflict resolution system 302 as well as Local Application A 304a and Local Application B 304b. In particular, the conflict resolution system 302 provides 330 a component (e.g., Component 1) to Local Application A 304a. For example, Local Application A 304a requests Component 1 upon a user accessing a digital asset that included Component 1. In various embodiments, the conflict resolution system 302 provides a copy of the component to the Local Application A 304a and maintains the original version or copy.

As shown, the Local Application A 304a modifies 332 the component. For example, a user adds data within the component within the Local Application A 304a. Indeed, the Local Application A 304a modifies Component 1 into Component 1A (e.g., the first modified component version) based on the user input.

Before the conflict resolution system 302 receives 334 the first modified component version (e.g., Component 1A) from the Local Application A 304a, the conflict resolution system 302 provides 336 the component to the Local Application B 304b. In this manner, both the Local Application A 304a and the Local Application B 304b have received the same version of the component (e.g., Component 1).

As shown, the Local Application B 304b modifies 338 the component. For example, the user removes data within the component within the Local Application B 304b. Indeed, the Local Application B 304b modifies Component 1 into Component 1B (e.g., the second modified component version) based on the user input. Then, the conflict resolution system 302 receives 340 the second modified component version (e.g., Component 1B) from the Local Application B 304b.

The conflict resolution system 302 detects 342 a component conflict between the two modified versions of the component (e.g., Component 1A and Component 1B). In some embodiments, the conflict resolution system 302 receives Component 1A and Component 1B at the same time and determines that two modified versions differ from the currently maintained version of the component (e.g., Component 1). For example, the conflict resolution system 302 performs a checksum hash to quickly determine that Component 1A and Component 1B differ from Component 1 as well as from each other.

In alternative embodiments, the conflict resolution system 302 has replaced Component 1 with Component 1A before receiving Component 1B. However, before replacing Component 1A with Component 1B, the conflict resolution system 302 recognizes that Component 1A and Component 1B both branch off of Component 1. Therefore, the conflict resolution system 302 detects 342 that Component 1B causes a component conflict with currently updated Component 1A.

Upon detecting the component conflict, the conflict resolution system 302 resolves 344 the conflict. For example, the conflict resolution system 302 utilizes a format-specific rule set to resolve the component conflict. Additional detail regarding resolving the conflict is provided below with respect to FIGS. 5-6B.

As mentioned above, FIG. 3C illustrates a sequence diagram of the conflict resolution system 302 detecting a remote component conflict. As shown, FIG. 3C includes the client device 300 having the conflict resolution system 302 and the Local Application A 304a. In addition, FIG. 3C includes the server device 301 having the cloud storage 306. For ease of explanation, duplicative actions between FIG. 3B and FIG. 3C share the same call out numbers. For example, acts 330, 334, 342, and 344 are repeated in FIG. 3C.

As shown in FIG. 3C, the conflict resolution system 302 synchronizes 350 a component (e.g., Component 1) with the server device 301. For example, in one or more embodiments, the client device 300 provides Component 1 to the server device 301 to add or update the component in the cloud storage 306. In alternative embodiments, the server device 301 provides a copy of Component 1 to the client device 300 during the synchronization process. Component 1 may be provided in connection with other components belonging to the same digital asset.

As also shown, the conflict resolution system 302 provides 330 the component (e.g., Component 1) to the Local Application A 304a. In addition, the Local Application A 304a modifies 332 the component. As described above, Component 1 becomes Component 1A (e.g., the first modified component version) upon modification by the Local Application A 304a. Further, as described above, the conflict resolution system 302 receives 334 the first modified component version (e.g., Component 1A) from the Local Application A 304a.

Before the conflict resolution system 302 receives Component 1A from the Local Application A 304a or before the conflict resolution system 302 can synchronize Component 1A with the server device 301, the server device receives 352 a second modified component version (e.g., Component 1B). For example, a second user on another client device synchronizes Component 1B to the cloud storage 306 on the server device 301, while the first user was locally modifying the component on the client device 300 within the Local Application A 304a.

As shown, the conflict resolution system 302 receives 354 the second modified component version (e.g., Component 1B), for example, during a synchronization update. At this point, the conflict resolution system 302 detects 342 a component conflict between the two modified versions of the component (e.g., Component 1A and Component 1C) as described previously. Additionally, upon detecting the component conflict, the conflict resolution system 302 resolves 344 the conflict as explained above. Further, as shown, the conflict resolution system 302 can synchronize 356 the resolved component with the server device 301.

While FIGS. 3A-3C illustrate component conflict scenarios detected by the conflict resolution system 302 located on a client device. Similar component conflict scenarios can be detected when the conflict resolution system 302 is located on the server device 301. In particular, when the conflict resolution system 302 is located on the server device 301, the conflict resolution system 302 detects component conflicts when synchronizing different modified versions of a component with multiple client devices. The conflict resolution system 302 can resolve the component conflict and provide the resolved component to the corresponding client devices.

Figure 4:
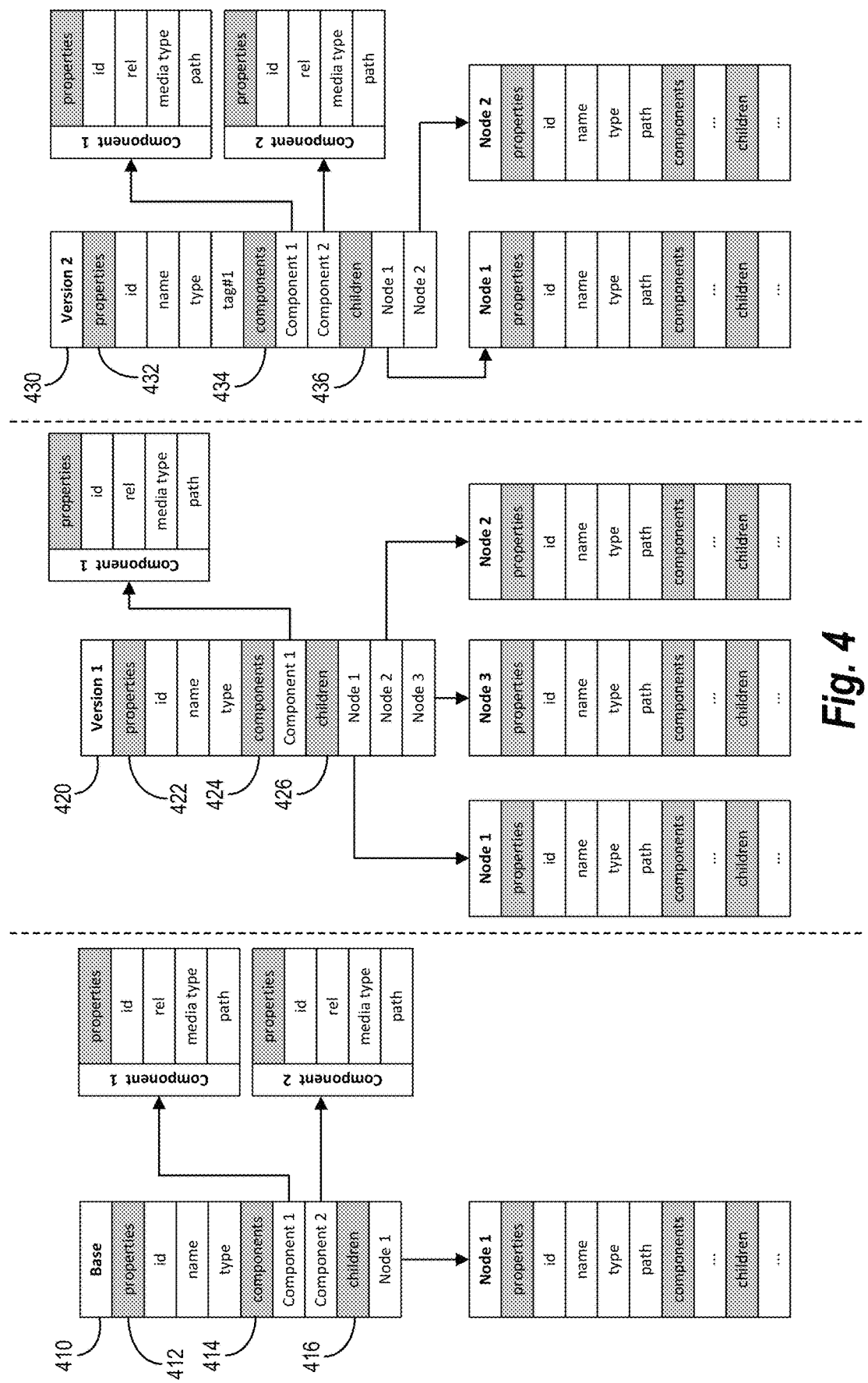
FIG. 4 illustrates an example schematic diagram of different versions of the same digital asset in accordance with one or more embodiments.

Turning to FIG. 4, example component conflicts are described. To illustrate, FIG. 4 shows examples of different versions of the same digital asset, which can cause a number of component conflicts. In particular, FIG. 4 shows three versions or branches of a digital asset—a base version 410 ("Base"), a first modified version 420 ("Version 1"), and a second modified version 430 ("Version 2"). The first modified version 420 and the second modified version 430 of the component are both based on the base version 410 of the component (e.g., both Version 1 and Version 1 descend from Base).

Each version of the digital asset includes a manifest that structures the digital asset by nodes (e.g., a root node and child nodes). Further, each node includes properties, components and child nodes as described above. For example, the base version 410 includes a root node having a properties array 412, a components array 414, and a child nodes array 416. The first modified version 420 includes a root node having a properties array 422, a components array 424, and a child nodes array 426. The second modified version 430 includes a root node having a properties array 432, a components array 434, and a child nodes array 436. A description of properties, components and child nodes is provided above in connection with FIG. 2.

As shown, the first modified version 420 and the second modified version 430 of the digital asset differ from each other and the base version 410 of the digital asset on a structural level. To illustrate, the base version 410 includes two components and one child node. The first modified version 420 removes a component and adds two child nodes from the base version 410. The second modified version 420 maintains the same number of components and adds a child node from the base version 410.

In addition, the first modified version 420 and the second modified version 430 differ from each other and the base version 410 of the digital asset on a composite-part level. For instance, the second modified version 420 adds a tag ("tag #1") to the properties array 432 in the root node of Version 2. Further, the nodes and components themselves can differ between the versions of the digital asset. For example, the added child node 2 of the first modified version 420 can differ from the added child node 2 of the second modified version 430 of the digital asset.

Based on the differences between the base version 410 and the modified versions, the conflict resolution system 302 detects multiple component conflicts. To illustrate, FIG. 5 shows a flow diagram of resolving detected conflicts within a composite-part-based digital asset in accordance with one or more embodiments. In many embodiments, the conflict resolution system 302 implements the actions described in connection with FIG. 5. The conflict resolution process shown in FIG. 5 is described in reference to the digital assets of FIG. 4.

As shown, the conflict resolution system 302 detects 502 a conflict between multiple versions of a digital asset. For example, the conflict resolution system 302 determines a difference in modification date, version number, size, and/or other property attributes between the base version 410, the first modified version 420, the second modified version 430 of the digital asset. In addition, the conflict resolution system 302 can detect a different number of components or child nodes between the three versions. Often, the conflict resolution system 302 detects the digital asset conflict upon synchronizing the modified versions of the digital asset, as described above with respect to FIG. 3A.

Upon detecting a conflict, the conflict resolution system 302 inspects each element and component of the versions of the digital asset to identify the origin of the conflict. For example, in various embodiments, the conflict resolution system 302 examines 504 the types between each of the digital asset versions at their root nodes. In particular, the conflict resolution system 302 performs a three-way differential (or simply "3-way diff") of the types (e.g., media type and/or file type) with respect to the respective properties arrays to determine whether any of the root node media types conflict.

In the infrequent case that the type of the three branches is not identical, the conflict resolution fails. Indeed, if a user changes the type (e.g., file format) of the root node in one of the modified versions (e.g., changed the digital asset from a photo application file to a document application file), then the conflict resolution system 302 cannot resolve any further conflicts between the versions of the digital asset. Instead, the conflict resolution system 302 forks the modified version of the digital asset with the different type into a new file and replaces the base version 410 with the remaining modified version sharing the same type as the base version 410.

The conflict resolution system 302 can also verify that other root node properties match between the versions of the digital asset. For example, the conflict resolution system 302 verifies that the identifier attribute matches between the base version 410, the first modified version 420, and the second modified version 430. Similarly, the conflict resolution system 302 can also verify that the name matches between versions.

Upon determining that the types and/or other property attributes match between the different digital asset versions, the conflict resolution system 302 traverses 506 version hierarchies to detect any composite-part conflicts. For instance, the conflict resolution system 302 starts with the root nodes. For each node, the conflict resolution system 302 compares properties attribute values with properties attribute values, components with components, and recursively, child node with child node. Similarly, when present, the conflict resolution system 302 can also compare elements with elements within corresponding nodes of the different versions of the digital assets.

In various embodiments, when comparing the properties of a node, the conflict resolution system 302 can match the names of the property attributes. In one or more embodiments, the conflict resolution system 302 creates a list of all the property attribute names of the Version 1 and Version 2 nodes, then iterates over the list of property attribute names and finds the different property attributes in the three branches (i.e., versions).

When comparing the components of a node, the conflict resolution system 302 can match components by their paths. In this manner, the conflict resolution system 302 can handle situations where the same components are created with different identifiers in the different versions of the digital asset. Further, when comparing child nodes, the conflict resolution system 302 can match the nodes in the different versions by their identifiers. Accordingly, the conflict resolution system 302 can detect and handle positional moves of child nodes. Notably, when a modified version of a digital asset has moved a child node to a different parent node, the conflict resolution system 302 will treat the move as a removal of the node from one parent and as an addition of a new node to the other parent node.

For each traversed component, the conflict resolution system 302 performs a comparison, such as a 3-way diff to determine whether a conflict exists between the base version 410, the first modified version 420, and the second modified version 430. As described above, when components do not match, the conflict resolution system 302 detects 508 a component conflict. For example, in traversing through the component arrays of the root nodes, the conflict resolution system 302 detects a conflict with Component 2 between the base version 410, the first modified version 420, and the second modified version 430—namely, the first modified version 420 has removed Component 2 while the second modified version 430 has maintained/modified Component 2.

Upon detecting a component conflict, the conflict resolution system 302 identifies and loads 510 rules from a rule set for the media type of the conflicted component. As described below in connection with FIGS. 6A-6B, in many embodiments, rule sets are specific to a media type or group of media types (e.g., document/*+dcx). Thus, upon detecting a component conflict, the conflict resolution system 302 identifies one or more rule sets (i.e., format-specific rule sets) corresponding to the media type (e.g., file format) of the conflicted component.

In some embodiments, the conflict resolution system 302 initially identifies and loads rule in a rule sets matching the media type identified in the root node. If the conflicted component shares the same media type, then the conflict resolution system 302 has the rule pre-loaded to apply when needed. Otherwise, the conflict resolution system 302 identifies and loads different rules in the rule set (of from another rule set) corresponding to the media type of the component having the detected conflict. Similarly, if the conflict resolution system 302 detects a conflict of an element within a node or component (e.g., an embedded element) that has a different media type than currently loaded, the conflict resolution system 302 can update the loaded rule to match the media type of the conflicted element.

Often, the conflict resolution system 302 loads multiple rule sets. If the conflict resolution system 302 identifies 512 multiple rule sets, the conflict resolution system 302 either determines 514 rule set priorities or moves forward with the single identified rule set. At least one rule set contains default rules for all media types, so the conflict resolution system 302 will always identify at least one conflict resolution rule set.

As mentioned above, when multiple rule sets are identified 512, the conflict resolution system 302 determines 514 a priority order for the multiple rule sets. While the conflict resolution system 302 loads and applies all identified rule sets, the conflict resolution system 302 can favor one rule set over another rule set. For instance, the conflict resolution system 302 prioritizes more specific rule sets over more generic sets. For example, a rule set for the exact media type of the conflicted component is more specific than a rule set that corresponds to multiple media types. If there is a rule set overlap or conflict between two rule sets, the conflict resolution system 302 utilizes the rule set having the higher priority and/or greater specificity.

In some embodiments, the conflict resolution system 302 bypasses, skips, and/or ignores a lower priority rule set. For example, the conflict resolution system 302 first applies a higher priority rule set. If all of the conflicts are resolved, when the conflict resolution system 302 applies the lower priority rule set, no rules are triggered as no conflicts remain. Alternatively, when no conflicts remain, the conflict resolution system 302 can bypass the lower priority rule set. However, if conflicts still remain after applying the higher priority rule set, the conflict resolution system 302 can apply the rules from the lower priority rule set to resolve the conflict.

Upon selecting one or more rule sets, the conflict resolution system 302 resolves 516 the conflict of the component with the identified rule sets. More particularly, the conflict resolution system 302 utilizes one or more rules in a rule set to identify a condition and resolution action for the conflict. Additional detail regarding utilizing rules to resolve component conflicts is provided below with respect to FIGS. 6A-6B.

Upon applying the rule set, the conflict resolution system 302 determines 518 if the conflict is resolved. For instance, the conflict resolution system 302 determines if one of the rules in the rule set was properly applied. For example, upon updating the component in the base version 410 to a resolved version of the component, the conflict resolution system 302 determines that the component conflict is resolved. In another example, the conflict resolution system 302 again compares the component between the three versions to determine if executing a rule from the identified rule set has resolved the conflicted component.

If the conflicted component is resolved, the conflict resolution system 302 updates the digital asset with the resolved component. Additionally, the conflict resolution system 302 determines 524 whether additional components (or other composite parts) exists. If yes, the conflict resolution system 302 traverses 506 the version hierarchies to detect any additional conflicts. Further, the conflict resolution system 302 repeats the previous acts 508-518 if a conflict is detected. Otherwise, the conflict resolution system 302 synchronizes 526 the updated digital asset among the corresponding client devices (and/or server devices).

Figure 5:
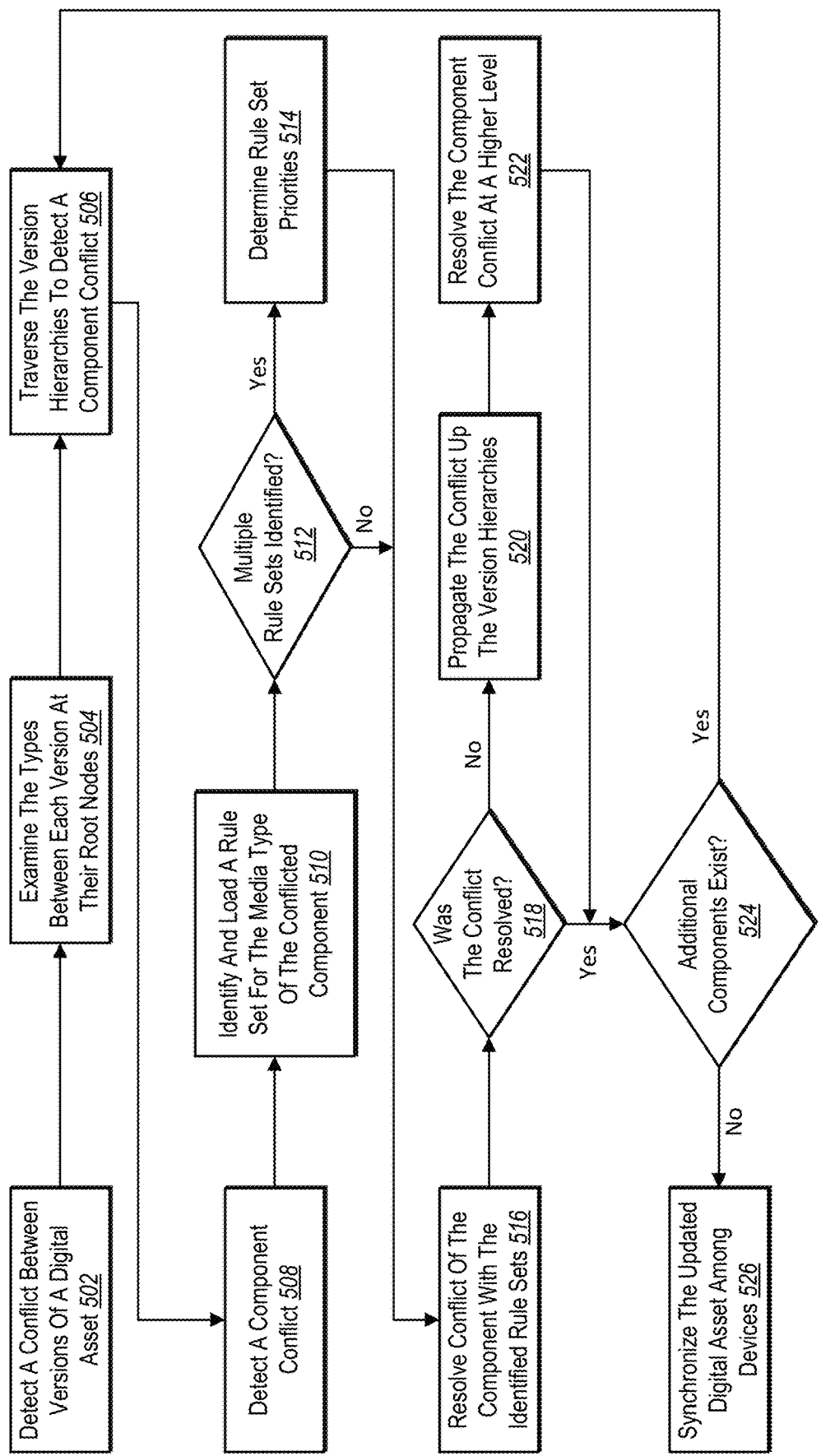
FIG. 5 illustrates a flow diagram of resolving a conflict within a composite-part-based digital asset in accordance with one or more embodiments.

If, however, the conflict is not resolved, the conflict resolution system 302 propagates 520 the conflict up the version hierarchies, as shown in FIG. 5. For example, in one or more embodiments, the conflict resolution system 302 moves back up the tree-like structure hierarchy of the parent nodes in search of a rule set that prescribes how to resolve the conflict. In this manner, the conflict resolution system 302, using common programming language terms, "throw" and "catch" the component conflict. Thus, the conflict resolution system 302 can largely avoid the need for immediate user intervention and find alternative ways to resolve a component conflict when one or more previous attempts fail.

As shown, the conflict resolution system 302 resolves 522 the component conflict at a higher level in the version hierarchy. In many embodiments, the conflict resolution system 302 resolves the propagated component conflict by forking the component or node with the conflict. However, in some embodiments, the conflict resolution system 302 identifies a rule or rule set that provides a more seamless resolution. Rarely, however, if no matching rule can be found, even after propagating to the root node, the conflict resolution system 302 can fork the different versions of the digital assets into multiple digital assets.

Upon resolving the component conflict at a higher level in the version hierarchy, the conflict resolution system 302 updates the digital asset with the resolved component. Additionally, the conflict resolution system 302 determines 524 whether additional components (or composite parts) exists. If yes, the conflict resolution system 302 traverses 506 the version hierarchies to detect any additional conflicts as well as repeats the previous acts 508-524 if a conflict is detected. Otherwise, the conflict resolution system 302 synchronizes 526 the updated digital asset among the corresponding client devices (and/or server devices) by syncing any resolved components.

Moreover, as part of resolving a component conflict, either at the component level or a higher level, the conflict resolution system 302 can annotate, mark, signal, or otherwise indicate the resolved conflict to the user. For example, in various embodiments, the conflict resolution system 302 provides a graphical user interface notification to the next user or users that access the digital asset indicating the resolution executed by the conflict resolution system 302. In some embodiments, the conflict resolution system 302 enables the user to select an option to undo the resolution and/or perform a different resolution.

In some embodiments, the conflict resolution system 302 resolves a component conflict in a manner that is obvious to a user upon the user next accessing the digital asset. To illustrate, in the example above given in connection with FIG. 1 above where the base version of a component had a blue background, the first modified version had a yellow background, and the second modified version had a green background, the conflict resolution system 302 resolves the component conflict by replacing the single blue base version with two components—the first component with yellow background and the second component with a green background. In this manner, when a user next accesses the digital asset, they will easily notice a yellow background version and a green background version and decide if one version should be kept over the other.

Additionally, in various embodiments, the conflict resolution system 302 adds flags, tags, and/or other indicators to the component and/or node to indicate the resolution and if additional action is required. For example, the conflict resolution system 302 adds a new property attribute to the properties array of the component or the parent node that specifies the conflict type, how the conflict was resolved, and/or if additional action is required by the conflict resolution system 302 or by a user. Examples of added special properties include "conflict-restored=true," "conflict-invalidated: true," and "conflict-forked: <original id>."

FIG. 5 describes various embodiments of resolving composite-part conflicts within digital assets (e.g., conflicts between properties, components, and child nodes). Accordingly, the actions and algorithms described in connection with FIG. 5 provide an example structure and acts for performing a step for resolving a conflict at a component level (or composite-part level) of the digital asset based on one or more format-specific rule sets without duplicating the digital asset. Indeed, one or more acts 502-526 shown in FIG. 5 can provide structure/acts for achieving a resolved component when a component conflict is detected between multiple versions of the same component of a digital asset.

Moreover, the description of FIG. 5 and the previous figures describe maintaining a digital asset comprising a first component and a second component, where the first component and the second component are stored as independent files as well as identifying a first modified version of the first component and identifying a second modified version of the first component. Additionally, the description of FIG. 5 and the previous figures describe determining a conflict between the first modified version of the first component and the second modified version of the first component. Further, FIG. 5 and the previous figures describe providing the resolved digital asset to a client device.

Figures 6A, 6B:
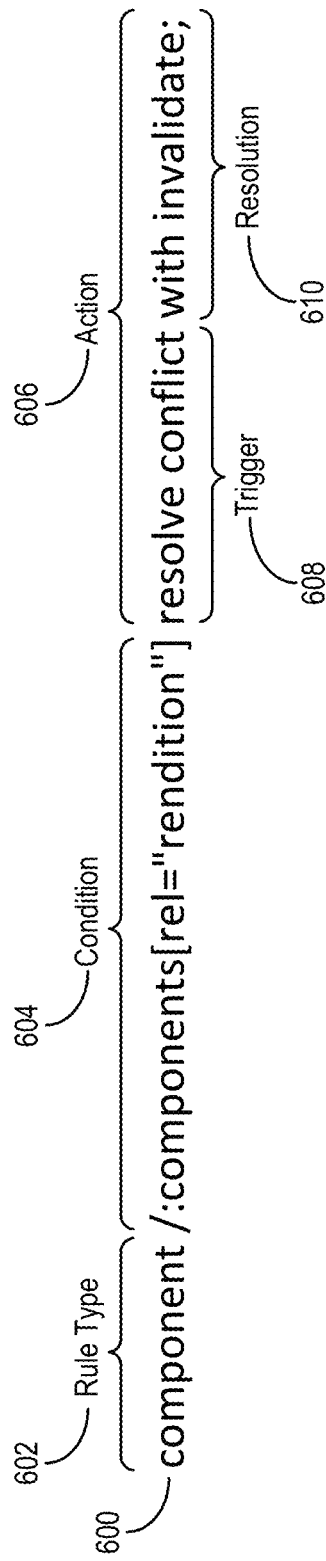
FIGS. 6A-6B illustrate example a format-specific rule set in accordance with one or more embodiments.

Turning now to FIGS. 6A-6B, additional detail is provided regarding applying format-specific rules. For instance, FIGS. 6A-6B illustrate example format-specific rules. As described above, rules are included in rule sets that correspond to a specific media type or groups of media types. Thus, the conflict resolution system 302 first determines one or more rule sets that apply to a component (or node) and then applies the rules in the rule set to the conflicted component. For context, FIG. 6A first provides an example composition of a format-specific rule. Then, FIG. 6B provides examples of rules in a rule set including a properties rule, a component rule, and a child node rule. In addition, Listing 1 included below, provides an example rule set in connection with the description FIG. 6B.

FIG. 6A includes a format-specific rule 600 (or simply "rule 600"). As shown, the rule 600 includes three clauses—a rule type clause 602, a condition clause 604, and an action clause 606. In general, the rule type clause 602 specifies whether the rule applies to the properties of a node (e.g., attributes in the properties array), a component, or a child node. Examples of three rule types are shown in FIG. 6B.

In some embodiments, the rule type includes additional information (e.g., an expression) that further specifies where the rule is to be applied within a component. For example, for a component rule, a rule type clause of "component (application/rdf+xml)" specifies that the rule applies to components that include a particular media type (e.g., XML). As another example, a rule type clause 602 "property (timestamp)" specifies that the property designated in the condition clause should be interpreted as a string containing a timestamp.

The condition clause 604 (e.g., selection clause) indicates the circumstances of when the rule 600 should be applied (e.g., which part of the component or composite part the rule targets). For instance, in various embodiments, the condition clause 604 specifies the portions of a component (or properties/child node, depending on the rule type) to compare and what the nature of the difference is between the two independently modified portions. Accordingly, the condition clause 604 includes a path (e.g., ":", "/:", "/*:", and "/**:") and a selector (e.g., "created," "modified," or "removed"). Indeed, the rule type clause 602 and the condition clause 604 together instruct the conflict resolution system 302 regarding the parts of the digital asset to which to apply the rule 600 and under what circumstances to apply the rule 600.

In addition, the different rule types for properties, components, and child nodes can each have different condition clauses specific to the rule type. To illustrate, example condition clauses for a properties rule type include ":*", ":width", "/:width", "/stack/*:width", and "/stack/children[0]:width". Example condition clauses for a component rule type include "/:*", "/**", "/:components[rel='rendition']", and "/stack/children[0]: components[type='image/png']".

As shown in FIG. 6B, the condition clause 604 is "/:components[rel='rendition']". This condition clause 604 instructs the conflict resolution system 302 to identify root-level components that have a "rel" (i.e., relationship) property value set to "rendition," which indicates that the component has been renditioned with other components (e.g., the component has been flatted with other components to form a single image for viewing). The condition clause of "/:*" refers to any property in the root node and "/**" refers to any node or component in the manifest of a digital asset. As another example, "/stack/children[0]:components [type="image/png"]" refers to all PNG components on the first child node of the node with the path "/stack."

In various embodiments, the action clause 606 specifies how the conflict resolution system 302 processes a rule when a condition in a digital asset or a component is triggered. Indeed, the conflict resolution system 302 executes the instructions in the action clause 606 to resolve conflicts between two independently modified components or other conflicting composite parts in a digital asset. As with the condition clause 604, the type of actions permitted in an action clause 606 often depends on the rule type clause 602. While the action clause 606 described herein relates to a conflict resolution action clause (e.g., the action clause 606 starts with "resolve"), the conflict resolution system 302 can utilize other types of action clauses.

As shown, the action clause 606 includes a trigger 608 and a resolution 610. In some embodiments, the trigger 608 includes descriptors of how the two independently modified portions of a digital asset (e.g., components) are different. Examples of triggers 608 include: resolve conflict, resolve modified, resolve new, resolve deleted, resolve different, resolve conflict, resolve Version 1-change, and resolve Version 2-change.

In various embodiments, the trigger 608 indicates the various types of differences between the two independently modified portions of the digital asset. For instance, the trigger 608 can account for unmodified, modified, new, or removed changes between the two portions. Examples of trigger scenarios of conflicts include (Version 1 listed before Version 2): modified-unmodified, deleted-unmodified, unmodified-modified, modified-modified, deleted-modified, new-new, deleted-new, unmodified-deleted, modified-deleted, and new-deleted. In additional embodiments, the type of trigger 608 can vary based on the combination of differences between the two independently modified portions the digital asset.

The resolution 610 indicates how the conflict resolution system 302 can resolve the particular conflict specified by the trigger 608. The action clause 606 can include multiple resolutions. Example resolutions for components include forking, invalidation, or merging (e.g., for XML metadata component). Example resolutions for properties include propagate, remove, keep Version 1, keep Version 2, restore, lesser, greater, and merge (e.g., set properties and dictionary properties). In one or more embodiments, child node rules follow the same structure and parameters as component nodes with respect to triggers and resolutions.

As shown, the action clause 606 of the rule 600 is "resolve conflict with invalidate." In this case, the conflict resolution system 302 keeps the conflicting component (e.g., Version 2) and marks it with a special property (e.g., "conflict#invalid=true") indicating that the version is invalid. For instance, a good candidate for invalidation is when a root-level rendition incorporates the renditions of multiple components. In this manner, the application that next accessed the digital asset detects the conflict#invalid flag and updates the component (or node) (e.g., performs a new rendition). As an alternative to the invalidate resolution, the conflict resolution system 302 can remove the conflicted version (e.g., Version 2). In some instances, removal of Version 2 signals the application that next accesses the digital asset to expect the data to be missing and to restore it on the next open.

In addition to the invalidation resolution mentioned above, other example resolutions include take one, compute, and propagate. With take one, the rule 600 instructs the conflict resolution system 302 to select one version over the other. In one or more embodiments, as long as the difference descriptor contains either the unmodified or the deleted keyword (i.e., the data in question was untouched in one of the versions), the conflict resolution system 302 can accept the change from the modified version.

For some kinds of conflicts, however, it is preferable to let one of the versions override the other, even if the data has been modified in both branches. For example, Version 1 has indicated that a component is marked as visible while Version 2 does not. In this case, it is preferable to lose that change instead of having to fork the component or node. In another example, a shared resource of a component (or node) gets deleted in one version but not the other. Here, the conflict resolution system 302 does not know if that resource is still being used in the resulting resolved branch. Thus, the conflict resolution system 302 applies a rule that restores the resource from the version where it was not deleted. Also, in this case, the conflict resolution system 302 marks the restored component (or node) with a special property (e.g., "conflict#restored=true") to signal the resolution.

Regarding the compute resolution mentioned above, if the data in questions was modified or created in both versions (e.g., modified-modified or new-new), an ideal resolution is to merge both versions. However, this resolution is only possible for a limited number of data types such as properties sets, properties dictionaries, and component XMP metadata. For certain property types, the conflict resolution system 302 can compare the different values and resolve the conflict by taking the lesser or greater value. For example, the conflict resolution system 302 implements this resolution for integers, numbers, and timestamp properties.

Regarding the propagate resolution mentioned above, as a last resort, the conflict resolution system 302 employs a "throw and catch" type of resolution. As described above, propagating a conflict passes (e.g., "throws") the conflict up the hierarchy of a digital asset to a higher level rule sets that detects the conflict (e.g., "catches"). Commonly, the conflict resolution system 302 resolves a propagated conflict by forking a component (or node), such as an artboard, layer, or page of a digital asset. These kinds of components (or nodes) represent natural forking points in the digital asset composite format.

Indeed, similar to the throw/catch mechanism found in many programming languages, the conflict resolution system 302 creates a first rule in a rule set that propagates (e.g., "throws") a conflict that cannot be resolved at a lower level of the digital asset hierarchy and a second rule that detects ("e.g., "catch") the propagated conflict at a higher level node. For example, the first rule might state "if a PNG image component which is a child of an artboard node has been modified in both versions then propagate a conflict" and the second rule might state "if a conflict gets propagated anywhere within an artboard node then fork that node." In this example, the conflict resolution system 302 specifies which parts of the digital asset can be forked, and thus, avoids forking or duplicating the whole digital asset.

In various embodiments, when forking a component (or node) the conflict resolution system 302 applies a special property to a propagated component or node (e.g., "conflict#forked={id}") to signal the propagation to the application next accessing the digital asset. For example, the application regenerates any invalidated renditions in response to detecting the special property. Further, upon detecting the special property, the application can indicate the forked component to a user. Indeed, the user can discover these forked composite parts and make decisions about whether to keep one or both of them.

As described above, the rules in a rule set enable the conflict resolution system 302 to apply semantic resolutions. More particularly, the conflict resolution system 302 can utilize rules to write new data into the digital asset to effectuate the conflict resolution and ensure the digital asset remains a valid parsable file. In one or more instances, the conflict resolution system 302 resolves semantic conflicts by incorporating special property attributes into nodes and components, as explained previously. In some embodiments, the conflict resolution system 302 adds or changes the data of the node or component based on the action clause 606 of a rule when applying a conflict resolution. Overall, as described above, the rules provide contextual (e.g., semantic) information about a given node or component to which the rule corresponds that enables the conflict resolution system 302 to know where and how to add additional data to resolve conflicts and render the digital asset into a legal digital asset. In this manner, the conflict resolution system 302 can resolve conflicts without requiring immediate user action and without duplicating the entire digital asset.

If the conflict resolution system 302 is unable to find a higher level node that can handle a propagated conflict, then the conflict resolution system 302 fails the resolution, accepts the modifications from Version 1, and duplicates Version 2 as a forked digital asset (or vice versa). Accordingly, the forked digital asset is a derivative of the original digital asset (e.g., updated as Version 1) that has special metadata (e.g., recorded in XML) that identifies it as a forked digital asset of Version 1. In this manner, applications will be able to detect forked digital assets and allow users to decide on how to proceed with the modified version and the fork version.

By executing rules from a rule set, the conflict resolution system 302 can identify and resolve most conflicts between different concurrent versions of a digital asset. As mentioned previously, when the conflict resolution system 302 detects multiple rule sets, the conflict resolution system 302 prioritizes the more specific rule set over a less specific rule set. For example, the conflict resolution system 302 includes a default rule set that applies to all digital assets. Thus, if the conflict resolution system 302 identifies the default rule set and another rule set corresponding to a given media type, the conflict resolution system 302 will apply the other rule set before applying the default rule set.

As mentioned previously, FIG. 6B shows examples of rules in a rule set. In particular, FIG. 6B includes a properties rule 612, a component rule 614, and a child node rule 616. Listing 1 below includes a rule set that includes the properties rule 612, the component rule 614, and the child node rule 616 in the context of the rule set.

Listing 1

```
#HEADER
rule-format-version 1;
media-type image/vnd.application.cls+dcx;
name "Sample Image Rules";
#RULES
# If the root-level dimensions have changed in any branch, propagate a conflict.
    property /:width, /:height resolve modified with propagate;
# Mark root-level renditions that were modified/created in both versions-these
    will become out of date when the conflict resolution is executed.
       component /:components[rel="rendition"] resolve conflict with invalidate;
# Duplicate layers of the stack that have propagated conflicts and provide a
    template for the path property.
       node /stack/* resolve propagated with fork, path with "<original>-<#>";
#EXCEPTIONS
# The following properties do not represent changes to the image layer contents,
    and thus, do not duplicate the whole image layer if one of them is in conflict.
       property /stack/*:name,
       property /stack/*:visible,
       property /stack/*:opacity,
       property /stack/*:blendMode,
       property /stack/*:transform resolve conflict with theirs;
```

As shown in Listing 1, the rule set includes a header and rules. The header includes a rule-format version, a media type, and a rule set name. In various embodiments, the rule-format-version is used to ensure that a rule set can evolve into different formats. Accordingly, the conflict resolution system 302 can reject any rule set with a rule format-version greater than what it is programmed to process.

As described above, the media type specifies the digital asset format or group of formats to which the rule set applies. In some embodiments, the given media type must end with +dcx. When applying the rules to a digital asset (or an element of a digital asset), the conflict resolution system 302 first collects all rule sets that apply to the given media type, as explained earlier. For example, for a component with the media type documents/vnd.application.cls+dcx, the conflict resolution system 302 may find the following three rules sets that support the following media types: 1) documents/vnd.application.cls+dcx, 2) documents/*+dcx, and 3) */*+dcx. The third example media type corresponds to the default rule set that applies to all media types (e.g., all composite-part-based digital assets).

Also, as described above, composites can embed other composites of different media types as elements. In these instances, when processing an element (e.g., embedded composite) with a different media type as an embedded element, the conflict resolution system 302 can recognize the element and switch to the appropriate collection of rule sets while processing that element.

As explained previously, the name of a rule set is for informational purposes. The conflict resolution system 302 can utilize the rule set name in logs to identify which rule sets have been utilized. In many embodiments, the rule set name should be a human-readable string identifying the rule set and the specific version of the rule set.

Figure 7:
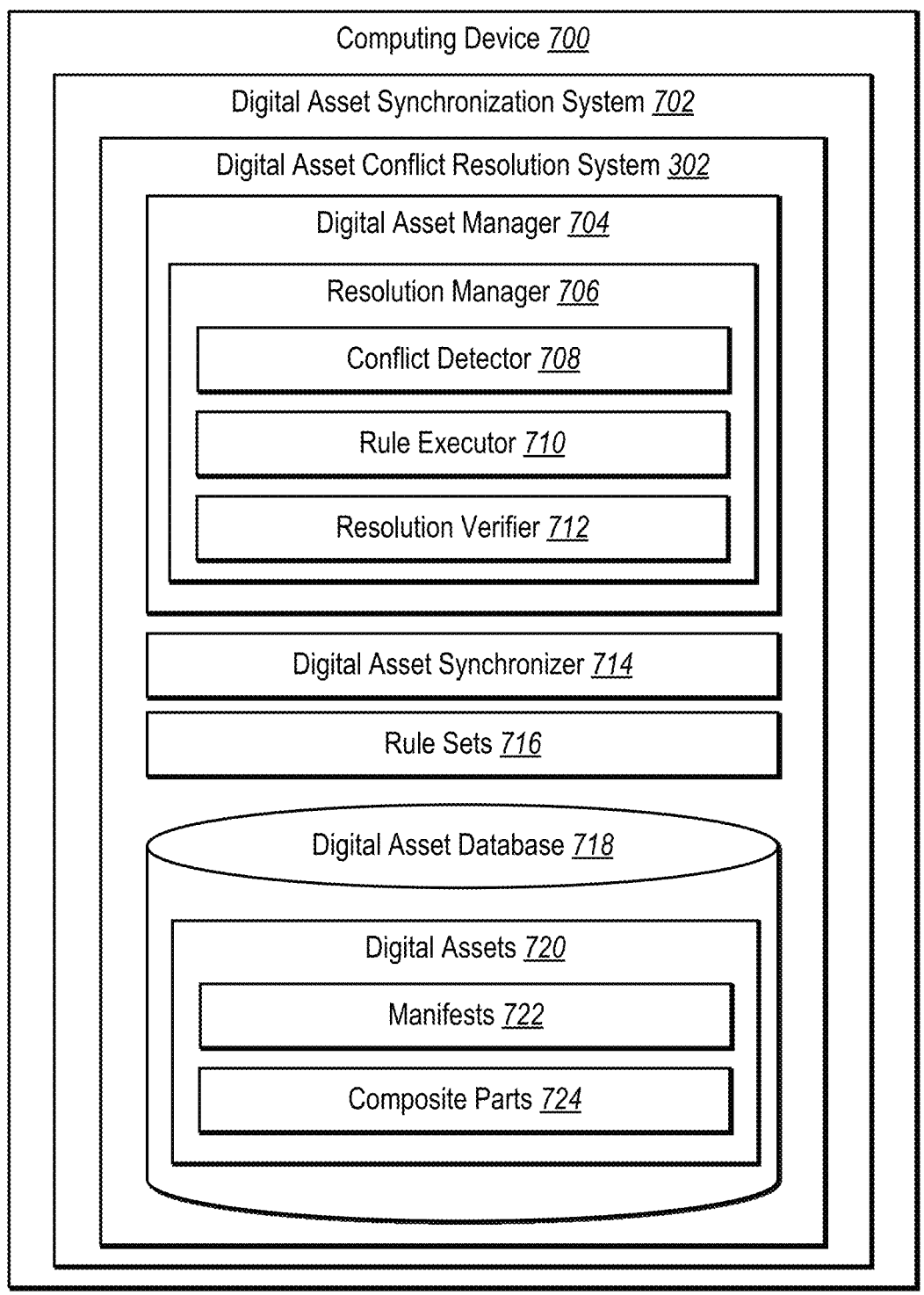
FIG. 7 illustrates an example schematic diagram of a digital asset conflict resolution system in accordance with one or more embodiments.

Turning now to FIG. 7, additional detail is provided regarding an example architecture of the digital asset conflict resolution system ("conflict resolution system 302"). In particular, FIG. 7 illustrates an example schematic diagram of the conflict resolution system 302 in accordance with one or more embodiments. As shown, the conflict resolution system 302 resides on a computing device 700, such as a client device or server device. Additional detail regarding the computing device 700 is provided below with respect to FIG. 11.

As shown in the illustrated embodiment, the conflict resolution system 302 is part of a digital asset synchronization system 702 (or simply "synchronization system 702"). In alternative embodiments, the conflict resolution system 302 is located on the client device 300 independent from the synchronization system 702. For example, the conflict resolution system 302 and the synchronization system 702 are located on separate computing devices that are in communication with each other.

Generally, the synchronization system 702 facilities the management, storage, access, and synchronization of digital assets particularly composite-part-based digital assets. For instance, the synchronization system 702 provides increased flexibility and improved computing functionality by enabling simultaneous access and editing of the same digital asset by multiple users, applications, and/or devices as well as across a range of digital assets, regardless of their type (e.g., images, documents, presentations, videos, animations, and infographics). When the synchronization system 702 detects a change in one composite part of a digital asset, the synchronization system 702 automatically propagates the change to other users, applications, and/or devices simultaneously accessing the digital asset.

Additionally, the synchronization system 702 utilizes efficiencies gained by synchronizing only modified composite parts of a digital asset rather than synchronizing the entire digital asset. Indeed, the synchronization system 702 provides bandwidth-efficient synchronization between devices such that only a fraction of a digital asset is transmitted when a modification occurs. Further, the synchronization system 702 enables maintaining numerous versions of a digital asset, both locally and remotely, with little additional storage cost by maintaining multiple manifests (e.g., mappings) linked to different arrangements of composite parts (including different versions of a composite part).

In some embodiments, the synchronization system 702 operates on both a client device and a server device that are in communication with one another, for example, to facilitate syncing digital assets between the devices. To illustrate, FIG. 8 below provides an example environment where a local digital asset synchronization system operates on a client device and a remote digital asset synchronization system operates on a server device.

Returning to FIG. 7, the conflict resolution system 302 includes a digital asset manager 704, a digital asset synchronizer 714, rule sets 716, and a digital asset database 718. The digital asset manager 704 includes a resolution manager 706 having a conflict detector 708, a rule executor 710, and a resolution verifier 712. The digital asset database 718 includes digital assets 720 having manifest 722 and composite parts 724.

The digital asset manager 704 generally facilitates identifying, accessing, and modifying digital assets, including composite parts of a digital asset. As part of this process, the digital asset manager 704 identifies composite parts of a digital asset (e.g., within a digital asset manifest). For example, when a user creates a new digital asset in an application, the digital asset manager 704 creates a composite-part manifest (e.g., a mapping) that links each composite part stored as a separate independent file to the digital asset.

As mentioned above, the digital asset manager 704 includes a resolution manager 706. In one or more embodiments, the resolution manager 706 detects and resolves conflicts between digital assets. In a simple scenario, when a user modifies a digital asset, the resolution manager 706 detects the change and updates the digital asset. In more complex scenarios, the resolution manager 706 detects and resolves digital asset and/or composite part conflicts between multiple modified versions of the same digital asset and/or composite part.

As shown, the resolution manager 706 includes a conflict detector 708, a rule executor 710, and a resolution verifier 712. The conflict detector 708, in general, detects when a conflict arises between two modified versions of a digital asset. In particular, the conflict detector 708 determine when two versions (or branches) of a digital assets differ from a common base version, as described above in connection with FIGS. 3A-3C. In addition, as described in connection with FIG. 5, the conflict detector 708 also determines which composite parts (e.g., properties, elements, components, and/or child nodes) of the different digital asset versions conflict.

Further, the resolution manager 706 includes the rule executor 710. In various embodiments, the rule executor 710 identifies rules that apply to a conflicted component, property attribute, or child node. For example, the rule executor 710 utilizes the rule type and/or media type of the conflicted composite part to identify one or more rule sets. For instance, the rule executor 710 stores loaded rules for a media type in memory during the conflict resolution process. Examples of rule sets are provided above in connection with FIGS. 6A-6B.

In various embodiments, the rule executor 710 also executes the rules in the identified rule sets to the conflicted composite parts. For example, the rule executor 710 resolve composite-part conflicts by applying the resolution action from a rule in the rule set to the portions of the composite parts that trigger the rule. FIG. 5 above further describes resolving digital asset conflicts based on executing rules.

In addition, the resolution manager 706 includes the resolution verifier 712. In some embodiments, the rule executor 710 fails to fully resolve a composite-part conflict (e.g., a component conflict) at the composite-part level. For example, the rule executor 710 propagates the conflict to a higher level within the digital asset's manifest. When this occurs, the resolution verifier 712 detects that the conflict is not yet resolved and again calls the rule executor 710 to handle the propagated conflict at the higher level. In this manner, the resolution verifier 712 ensures that the conflict is resolved without immediate user action. Also, the resolution verifier 712 ensures that the conflict is resolved in a manner that results in a valid executable file (e.g., the resolved digital asset conforms to the syntax rules of the corresponding software application). These and other actions of the resolution verifier 712 are provided above in connection with FIGS. 5-6B.

As shown in FIG. 7, the conflict resolution system 302 also includes the digital asset synchronizer 714. In general, the digital asset synchronizer 714 enables multiple users, applications, and/or devices to simultaneously access a digital asset. In addition, the digital asset synchronizer 714 facilitates synchronizing a digital asset between multiple devices, such as between multiple client devices and/or between a client device and a server device.

To demonstrate, in one or more embodiments, the digital asset synchronizer 714 detects when composite parts of a digital asset are being accessed from multiple locations. For instance, the digital asset synchronizer 714 communicates with the digital asset database 718 to detect when one or more applications (or users or devices) are viewing and/or modifying composite parts of a digital asset. For example, the digital asset synchronizer 714 recognizes a system call indicating that an application is requesting access to the digital asset database 718. Likewise, the digital asset synchronizer 714 determines when the application has finished accessing composite parts of a digital asset.

The digital asset synchronizer 714, as mentioned, can detect when a modification occurs within a digital asset being accessed simultaneously by multiple applications (or users or devices). For example, the digital asset synchronizer 714 recognizes when the digital asset manager updates the digital asset mapping (i.e., manifest) for a digital asset being simultaneously accessed. In some embodiments, upon detecting a change by a first application, the digital asset synchronizer 714 sends an indication (e.g., a direct message or multicast message) to the other applications to indicate that the mapping has been modified with the modified composite part. Alternatively, the digital asset synchronizer 714 indicates to the other applications that the digital asset mapping for the digital asset has changed, upon which the other applications can interface with the digital asset database 718 to locate and apply the change or have digital asset conflict be resolved by the resolution manager 706.

In addition, the digital asset synchronizer 714 performs synchronizations between multiple client devices and/or between a client device and a server device. In a number of embodiments, a digital asset is synchronized across multiple devices. The digital asset synchronizer 714 detects composite part modifications (as described above) and sends (i.e., pushes) modified version mappings and corresponding missing files to other devices. In addition, the digital asset synchronizer 714 can requests (i.e., pulls) version mappings and missing files from other devices.

As illustrated, the conflict resolution system 302 includes the rule sets 716. In one or more embodiments, the rule sets 716 are stored in one or more files (e.g., text files) along with composite parts of a digital asset. For example, the conflict resolution system 302 loads one or more rule sets 716 when performing conflict resolution between a digital asset or portions thereof. An example of a rule set is provided above in Listing 1, which is described in connection with FIG. 6B.

As shown in FIG. 7, the conflict resolution system 302 includes the digital asset database 718. In some embodiments, the digital asset database 718 is located apart from the conflict resolution system 302, such as on a separate computing device. As illustrated, the digital asset database 718 includes digital assets 720 having manifests 722 and composite parts 724. The manifests 722 can include a listing of composite parts that make up a digital asset. For example, each of the manifests 722 include properties, components, and child nodes. An example of a manifest is provided in FIG. 2. The composite parts 724 can include corresponding files that store the content of the composite parts. Alternatively, the composite parts 724 indicate file locations of the corresponding files, which are stored in a separate location, such as in another storage medium of the computing device hosting the conflict resolution system 302.

The elements 704-724 of the conflict resolution system 302 and can include software, hardware, or both. For example, the elements 704-724 can include one or more instructions stored on a computer-readable storage medium and executable by processors of one or more computing devices, such as a client device or server device. When executed by the one or more processors, the computer-executable instructions of the conflict resolution system 302 can cause the computing device(s) to perform the feature learning methods described herein. Alternatively, the elements 704-724 can include hardware, such as a special-purpose processing device to perform a certain function or group of functions. Alternatively, the elements 704-724 of the conflict resolution system 302 can include a combination of computer-executable instructions and hardware.

Furthermore, the elements 704-724 of the conflict resolution system 302 may, for example, be implemented as one or more operating systems, as one or more stand-alone applications, as one or more modules of an application, as one or more plug-ins, as one or more library functions or functions that may be called by other applications, and/or as a cloud-computing model. Thus, the elements 704-724 may be implemented as a stand-alone application, such as a desktop or mobile application. Furthermore, the elements 704-724 may be implemented as one or more web-based applications hosted on a remote server. The elements 704-724 may also be implemented in a suite of mobile device applications or "apps." To illustrate, the elements 704-724 may be implemented in one or more applications, including but not limited to, ADOBE CREATIVE CLOUD software. "ADOBE," and "CREATIVE CLOUD" are registered trademarks or trademarks of Adobe Inc. in the United States and/or other countries.

Figure 8:
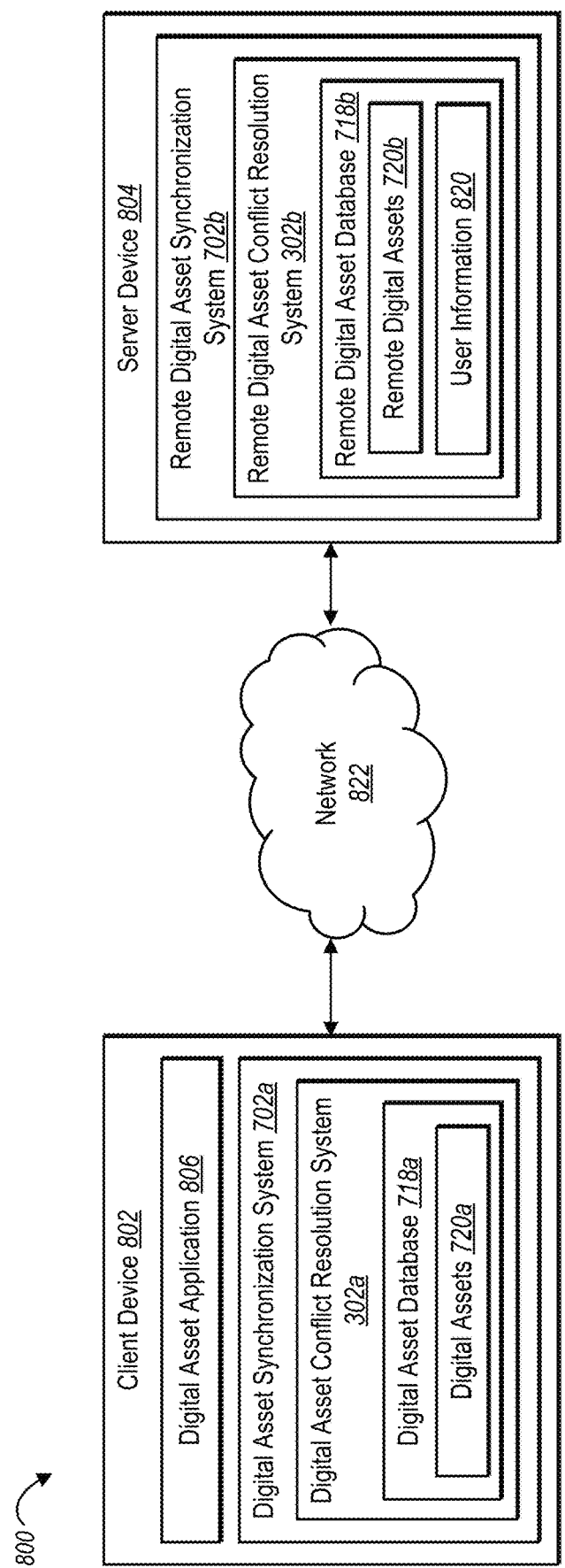
FIG. 8 illustrates an example environment in which the digital asset conflict resolution system can operate in accordance with one or more embodiments.

As mentioned above, the digital asset synchronization system 702 (hosting the conflict resolution system 302) can reside on a client device, a server device, or both. To illustrate, FIG. 8 shows an environment 800 that includes both a client device 802 and a server device 804, each hosting a version of the digital asset synchronization system. As illustrated, the client device 802 includes a digital asset synchronization system 702a having a digital asset conflict resolution system 302a, while the server device 804 includes a remote digital asset synchronization system 702b and a remote digital asset conflict resolution system 302b. The digital asset synchronization system 702a and the remote digital asset synchronization system 702b embody the digital asset synchronization system 702 described above in connection with FIG. 7. Likewise, both the digital asset conflict resolution system 302a and the remote digital asset conflict resolution system 302b embody the conflict resolution system 302 described above in connection with FIG. 7.

As shown in further detail, the client device 802 includes a digital asset application 806 (or simply "application 806") and the digital asset database 718a (within the digital asset conflict resolution system 302a and digital asset synchronization system 702a), which stores digital assets 720a. The server device 804 includes the remote digital asset conflict resolution system 302b within the remote digital asset synchronization system 702b, which stores user information 820 and remote digital assets 720b, corresponding to the digital assets 720a on the client device 802.

As further illustrated, the client device 802 communicates with the server device 804 via a network 822. Examples networks are provided below with respect to FIG. 11. Although FIG. 8 illustrates a particular arrangement of devices and elements, various additional arrangements are possible. For example, the environment 800 can include any number of client devices.

The client device 802 may represent various types of client devices. For example, in some embodiments, the client device 802 may be a mobile device, such as a mobile telephone, a smartphone, a PDA, a tablet, a laptop, a wearable device, etc. Additional details with respect to the client devices are discussed below with respect to FIG. 11.

In various embodiments, one or more users interact with the client device 802 to access digital assets, either directly on the client device 802 (e.g., digital assets 720a), or remotely on the server device 804 (e.g., remote digital assets 720b) via the network 822. As used herein, a user may be an individual (i.e., human user), a group, a business, or another entity. For example, co-workers using multiple client devices share a set of digital assets. In this example, each co-worker's client device maintains an up-to-date copy of the shared digital assets, which synchronizes via the server device 804. Further, two co-workers modifying the same composite part within a digital asset around the same time can create a composite-part conflict, as described above.

As shown in FIG. 8 and as mentioned above, the client device 802 includes an application 806. The application 806 can communicate with the digital asset synchronization system 702a and the digital asset conflict resolution system 302a to access one or more of the digital assets 720a in the digital asset database 718a. In general, an application enables a user to create, view, copy, modify, and/or delete a digital asset or portions thereof. In many cases, an application relates to a specific type of digital asset. For example, an application is a word-processing application that interfaces with digital documents. As another example, an application is an image editing application that interfaces with digital images.

As mentioned, the application 806 accesses the digital assets 720a. To demonstrate, the application 806 interfaces with the digital asset synchronization system 702a and the digital asset conflict resolution system 302a to obtain a manifest for a digital asset. As described above, the application 806 utilizes the manifest to identify the composite parts that make up the digital asset as well as the file locations (in the case of components) where the content of those composite parts are stored (as the components can be stored in files distributed across the client device 802). With access to the composite parts, the application 806 presents (e.g., displays) the digital asset to a user as a single monolithic file.

Further, in various embodiments, the application 806 detects annotations (e.g., special property flags) that are placed in a composite part as a result of resolving a conflict. In response the application 806 can perform application-specific operations to automatically repair or regenerate portions of the digital asset (e.g., generate a new rendition with an updated composite part). Additionally, or in the alternative, the application 806 passes on the annotation to a user accessing the digital asset. For example, the application 806 notifies the user of a past conflict and how the conflict has been resolved.

As further mentioned, the application 806, in one or more embodiments, enables a user to modify (e.g., create, change, or delete) one or more composite parts of a digital asset. For instance, if the digital asset is an image having multiple layers, the application 806 enables a user to edit content within a layer. In addition, the application 806 can enable the user to add or remove layers. Upon the application 806 creating or modifying a digital asset, the digital asset synchronization system 702a detects changes to the composite parts of the digital asset, updates the mapping for the digital asset, and modifies one or more corresponding files, as described above. Then, if a conflict is detected, the conflict resolution system 302a addresses the conflict.

The application 806, in some embodiments, can communicate with the remote digital asset synchronization system 702b and the remote digital asset conflict resolution system 302b to directly access the remote digital assets 720b. For example, the application 806 provides (e.g., displays a preview of) one or more of the remote digital assets 720b to a user and enables the user to select a digital asset to fully display or modify within the application. Further, in some embodiments, the application 806 accesses previous versions of a digital asset and/or specific composite part from the remote digital asset database 718b, such as when the digital asset database 718a on the client device 802 does not maintain previous versions of the digital asset, but the remote digital asset database 718b maintains the previous versions.

In one or more embodiments, the client device 802 includes multiple applications. For example, a user accesses the same digital asset simultaneously using two or more applications on the client device 802. As previously mentioned, when the user modifies the composite part within one application, the digital asset synchronization system 702a and the digital asset conflict resolution system 302a cause the other applications to update to reflect the change in the digital asset. Alternatively, if the digital asset is modified in both applications before cross-application synchronization, the conflict resolution system 302a detects and addresses the conflict.

As mentioned above, the server device 804 includes the remote digital asset synchronization system 702b and the remote digital asset conflict resolution system 302b. In addition, the server device 804 includes the remote digital asset database 718b. The remote digital asset database 718b often includes more digital assets than found on a client device, in short, because the client device does not locally sync a user's entire digital asset collection. Generally, the server device 804 has a larger storage capacity than a client device, especially mobile client devices.

To illustrate, the remote digital asset database 718b can store a full collection of digital assets while a client device only maintains a partial collection. As another example, as a result of the additional storage capacity of the server device 804, the remote digital asset database 718b stores one or more previous versions of a digital asset (e.g., version manifests and composite part files) or a composite part as mentioned above. In this manner, the remote digital asset synchronization system 702b and the remote digital asset conflict resolution system 302b can provide a previous version to a client device upon request.

The remote digital asset database 718b, in one or more embodiments, also includes user information 820. For example, the remote digital asset database 718b maintains digital assets for a multitude of users. As such, the remote digital asset synchronization system 702b and the remote digital asset conflict resolution system 302b associate each digital asset with one or more users that have rights to the digital asset. Because the remote digital asset synchronization system 702b and/or the remote digital asset conflict resolution system 302b can store each composite part of a digital asset in files distributed across the remote database (or in another storage location), the remote digital asset synchronization system 702b and/or the remote digital asset conflict resolution system 302b can store files from different users together.

To illustrate, the remote digital asset conflict resolution system 302b stores a first set of files from User 1 and User 2 together in a first directory and a second set of files from User 1 and User 2 in a second directory. As such, the remote digital asset synchronization system 702b and/or the remote digital asset conflict resolution system 302b can use the user information 820 to identify composite parts of a digital asset belonging to a particular user. In some instances, the remote digital asset synchronization system 702b and/or the remote digital asset conflict resolution system 302b add the user information 820 to the manifest (e.g., mapping) of a remote digital asset that is stored in the remote digital asset database 718b

As a note, while only one server device 804 is shown in FIG. 8, one will appreciate that the remote digital asset synchronization system 702b and the remote digital asset conflict resolution system 302b can operate across multiple server devices or be located on separate client devices. Further, while the remote digital asset conflict resolution system 302b and the remote digital asset database 718b are illustrated on the server device 804, in some embodiments, the remote digital asset database 718b is stored on a separate computing device or set of computing devices. For example, the remote digital asset database 718b is distributed across a cloud-based storage network.

As described above, the client device 802 communicates with the server device 804 to synchronize digital assets. More specifically, the digital asset synchronization system 702a and the digital asset conflict resolution system 302a on the client device 802 communicate with the remote digital asset synchronization system 702b and the remote digital asset conflict resolution system 302b to share one or more digital assets as well as resolve digital asset conflicts. For example, the client device 802 sends (e.g., uploads) digital asset data including newly created digital assets, modified composite parts (including a digital asset manifest and modified files), and/or other data to the server device 804. Similarly, the client device 802 receives (e.g., downloads) corresponding digital asset data from the server device 804. Upon downloading digital asset data, the client device 802 can send a confirmation indication to the server device 804 indicating successful receipt of the digital asset data.

While synchronizing data, the remote digital asset conflict resolution system 302b can detect a conflict between versions of a digital asset stored on different client devices. For example, a first user has been offline and not synchronized a digital asset for a period of time. In the meantime, at least one other user has modified the digital asset one or more times. Upon the first user synchronizing her version of the digital asset, the remote digital asset conflict resolution system 302b detects and resolves the conflicted digital asset for both the first user and the second user.

In addition, as mentioned above, the remote digital asset conflict resolution system 302b can perform semantic digital asset conflict resolution for digital assets of a particular digital asset application independent from the digital asset application itself. More particularly, by utilizing rule sets on the server device 804 that correspond to the media types of composite parts, the remote digital asset conflict resolution system 302b can resolve composite part conflicts during the synchronization process without opening or accessing the digital asset application corresponding to the digital asset (e.g., resolve a PHOTOSHOP component conflict on the server device 804 without accessing the PHOTOSHOP application). Overall, the digital asset conflict resolution system 302 (e.g., local or remote) provides superior flexibility by executing different implementations of the conflict resolution system in different modes, at different places, and at different times.

Figure 9:
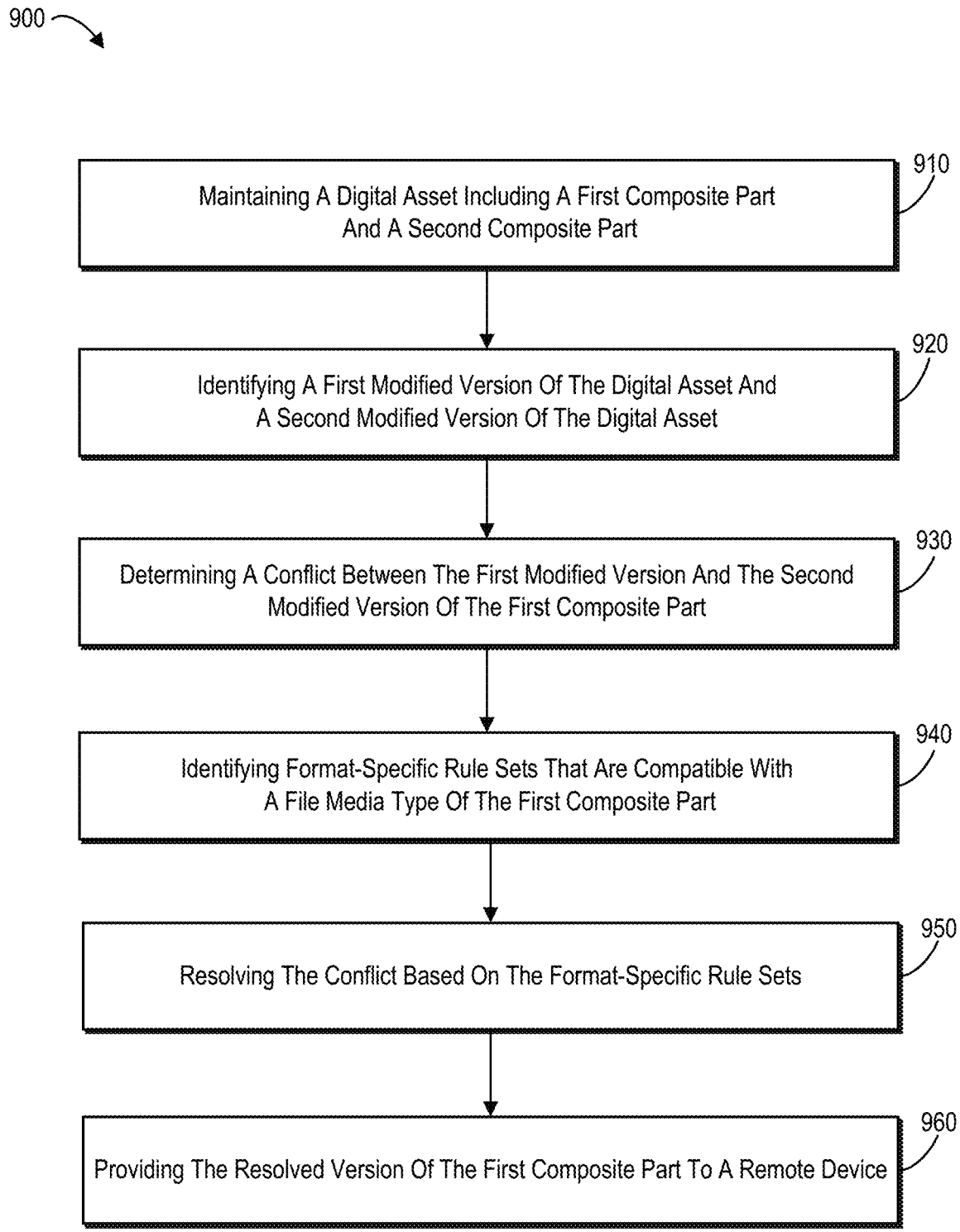
FIG. 9 illustrates a flowchart of a series of acts for resolving a conflict within a composite-part-based digital asset in accordance with one or more embodiments.
Figure 10:
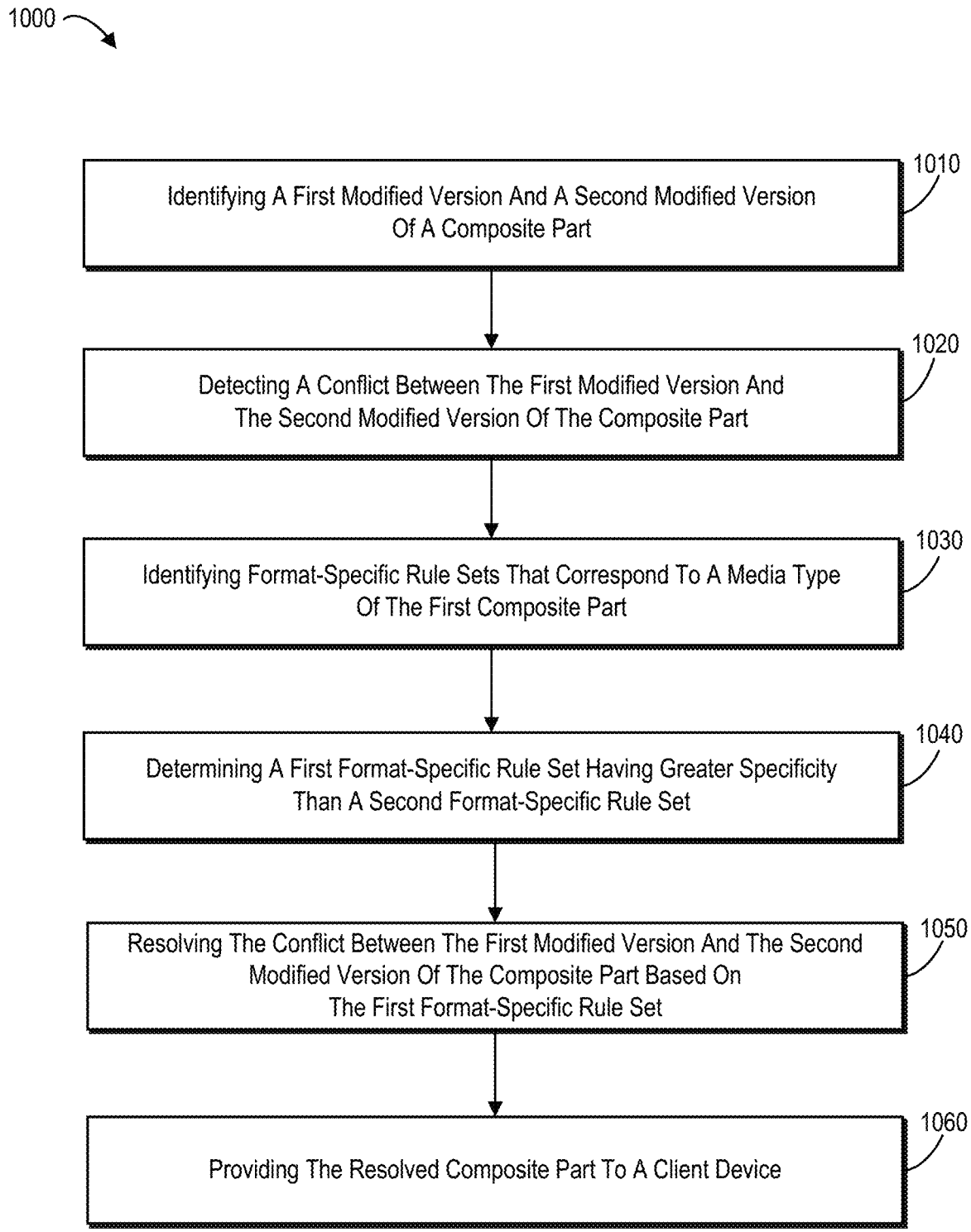
FIG. 10 illustrates a flowchart of a series of acts for utilizing format-specific rule sets to resolve a conflict within a composite-part-based digital asset in accordance with one or more embodiments.

FIGS. 1-8, the corresponding text, and the examples provide several different systems, methods, techniques, components, and/or devices of the digital asset conflict resolution system 302 in accordance with one or more embodiments. In addition to the above description, one or more embodiments can also be described in terms of flowcharts including acts for accomplishing a particular result. For example, FIG. 9 and FIG. 10 illustrate flowcharts of an example sequence of acts in accordance with one or more embodiments. In addition, FIG. 9 and FIG. 10 may be performed with more or fewer acts. Further, the acts may be performed in different orders. Additionally, the acts described herein may be repeated or performed in parallel with one another or parallel with different instances of the same or similar acts.

While FIG. 9 and FIG. 10 illustrate a series of acts according to particular embodiments, alternative embodiments may omit, add to, reorder, and/or modify any of the acts shown. The series of acts of FIG. 9 and FIG. 10 can be performed as part of a method. Alternatively, a non-transitory computer-readable medium can comprise instructions, when executed by one or more processors, cause a computing device (e.g., a client device and/or a server device) to perform the series of acts of FIG. 9 and FIG. 10. In still further embodiments, a system performs the series of acts of FIG. 9 and FIG. 10.

In addition, the series of acts of FIG. 9 and FIG. 10 can be implemented on one or more computing devices, such as the computing device 700, client devices 300, 802, or server devices 301, 804. In addition, in some embodiments, the series of acts of FIG. 9 and FIG. 10 can be implemented in a digital environment for performing digital asset management of composite files. In various embodiments, the series of acts of FIG. 9 and FIG. 10 are implemented on a computing device having a memory that stores format-specific rules sets, each format-specific rule set corresponding to at least one media type. In some embodiments, the memory stores a digital asset including a first composite part and a second composite part, where the first and second composite parts are stored as independent files, and where each composite part has a defined boundary within the digital asset that is modifiable without affecting other composite parts of the digital asset.

To illustrate, FIG. 9 shows a flowchart of a series of acts 900 for resolving a conflict within a composite-part-based digital asset in accordance with one or more embodiments. The series of acts 900 includes an act 910 of maintaining a digital asset that includes a first composite part and a second composite part. In particular, the act 910 can involve maintaining a digital asset including a first composite part and a second composite part. In one or more embodiments, the digital asset further includes a manifest indicating properties and composite parts of the digital asset, the composite parts of the digital asset including the first composite part and the second composite part.

The series of acts 900 also includes an act 920 of identifying a first modified version of the digital asset and a second modified version of the digital asset. In particular, the act 920 can involve identifying a first modified version of the digital asset including the second composite part and a first modified version of the first composite part as well as identifying a second modified version of the digital asset including the second composite part and a second modified version of the first composite part. In one or more embodiments, the first modified version and the second modified version of the first composite part are modified independently at different sources, where the first composite part, the first modified version of the first composite part, and the second composite part are components stored as independent component files.

Moreover, the series of acts 900 also includes an act 930 of determining a conflict between the first modified version and the second modified version of the first composite part. In particular, the act 930 can involve determining a conflict between the first modified version of the first composite part and the second modified version of the first composite part. In some embodiments, the act 930 includes traversing corresponding composite parts in the manifest of the different versions of the digital asset to identify a composite part conflict.

As shown in FIG. 9, the series of acts 900 further includes an act 940 of identifying format-specific rule sets that are compatible with a file media type of the first composite part. In particular, the act 940 can involve identifying, based on determining the conflict, one or more format-specific rule sets that are compatible with a file media type of the first composite part. In one or more embodiments, the act 940 includes determining that the one or more format-specific rules, in an identified rule set that is compatible with the media type of the first composite part, does not resolve the conflict; and, in response, propagating the conflict to a parent rule, in the identified rule set, to resolve the conflict. In additional embodiments, the parent rule resolves the conflict by forking the first modified version of the first composite part and the second modified version of the first composite part into two separate composite parts within the digital asset without duplicating the digital asset.

In various embodiments, the act 940 includes identifying a first format-specific rule set and a second format-specific rule set that are compatible with the file media type of the first composite part. In additional embodiments, the act 940 includes updating the first composite part based on the first format-specific rule set and the second format-specific rule set. In alternative embodiments, the act 940 includes identifying an overlap between the first format-specific rule set and the second format-specific rule set, determining that the first format-specific rule set has a greater rule specificity than the second format-specific rule set, and updating the first composite part by applying the first format-specific rule set while bypassing the second format-specific rule set based on the specificity determination.

The series of acts 900 also includes an act 950 of resolving the conflict based on the format-specific rule sets. In particular, the act 950 can involve resolving the conflict between the first modified version of the first composite part and the second modified version of the first composite part based on the one or more format-specific rule sets to generate a resolved version of the first composite part. In one or more embodiments, the act 950 includes combining portions of the first modified version of the first composite part and the second modified version of the first composite part to render the digital asset unparsable or corrupt by a corresponding digital asset application followed by updating the first composite part based on the one or more format-specific rule sets to render the digital asset parsable by the corresponding digital asset application.

In some embodiments, the digital asset is associated with a first application on a client device and the act 950 includes resolving the conflict between the first modified version of the first composite part and the second modified version of the first composite part at the client device remote from the first application. In addition, the digital asset is associated with a first application on a client device and the act 950 includes resolving the conflict between the first modified version of the first composite part and the second modified version of the first composite part at a server device that does not host the first application. In various embodiments, the act 950 further includes annotating the resolved version of the first composite part to indicate the conflict resolution to a user who next accesses the digital asset having the resolved version of the first composite part.

As shown in FIG. 9, the series of acts 900 further includes an act 960 of providing the resolved version of the first composite part to a remote device. In particular, the act 960 can involve providing, upon resolving the conflict, the resolved version of the first composite part to a remote device to replace the first composite part. In some embodiments, the remote device is a cloud-based server. In alternative embodiments, the remote device is a remote client device.

To illustrate, FIG. 10 shows a flowchart of a series of acts 1000 for utilizing format-specific rule sets to resolve a conflict within a composite-part-based digital asset in accordance with one or more embodiments. The series of acts 1000 includes an act 1010 of identifying a first modified version and a second modified version of a composite part. In particular, the act 1010 can involve identifying a first modified version of a first composite part and a second modified version of the first composite part of a digital asset. In some embodiments, the first modified version of the first composite part and the second modified version of the first composite part share a same composite part identifier and a same path with the first composite part. In one or more embodiments, a first application at the client device generates the first modified version of the first composite part and a second application at the client device generates the second modified version of the first composite part. Furthermore, act 1010 can involve traversing a first manifest of a first version of the digital asset and a second manifest of a second version of the digital asset and comparing the first and second manifests node by node and composite part by composite part to identify that the first composite part in the first manifest differs from the first composite part in the second manifest.

The series of acts 1000 also includes an act 1020 of detecting a conflict between the first modified version and the second modified version of the composite part. In particular, the act 1020 can involve detecting a conflict between the first modified version of the first composite part and the second modified version of the first composite part of the digital asset. For example, the act 1020 includes receiving multiple different versions of the first composite part from difference sources.

Moreover, the series of acts 1000 also includes an act 1030 of identifying format-specific rule sets that correspond to a media type of the first composite part. In particular, the act 1030 can involve identifying a subset of format-specific rule sets from a rule set that correspond to a file media type of the first composite part. In some embodiments, the rule set is stored in a file with the first composite part and the second composite part on a client device and/or a server device.

As shown in FIG. 10, the series of acts 1000 further includes an act 1040 of determining a first format-specific rule set having greater specificity than a second format-specific rule set. In particular, the act 1040 can involve determining, from the subset of format-specific rule sets, a first format-specific rule set having greater specificity than a second format-specific rule set in the subset of format-specific rule sets. In one or more embodiments, the act 1040 includes determining that the rule type for the first format-specific rule set matches the media type of the first composite part. In additional embodiments, the act 1040 includes determining that the rule type for the second format-specific rule set is a default format-specific rule set that applies to all composite parts.

The series of acts 1000 also includes an act 1050 of resolving the conflict between the first modified version and the second modified version of the composite part based on the first format-specific rule set. In particular, the act 1050 can involve updating the digital asset by resolving the conflict between the first modified version of the first composite part and the second modified version of the first composite part based on the first format-specific rule set. In some embodiments, the act 1050 is based on the first format-specific rule set utilizing a software-agnostic process. In additional embodiments, the software-agnostic process occurs at a server device during synchronization of the digital asset with the client device that provides the first modified version of the first composite part. Act 1050 can involve accessing a selector clause in the first format-specific rule set that indicates which portion of the manifest of the first asset the first format-specific rule set applies; determining that a trigger clause in the first format-specific rule set indicates that the first format-specific rule set should be applied; accessing an action clause in the first format-specific rule set; and merging the first modified version of the first composite part and the second modified version of the first composite part in accordance with the action clause.

As shown in FIG. 10, the series of acts 1000 further includes an act 1060 of providing the resolved composite part to a client device. In particular, the act 1060 can involve providing, upon resolving the conflict, the updated digital asset to a client device. In some embodiments, the act 1060 includes providing an updated manifest for the digital asset along with the resolved composite part and/or resolved composite parts.

The term "digital environment," as used herein, generally refers to an environment implemented, for example, as a stand-alone application (e.g., a personal computer or mobile application running on a computing device), as a part of an application, as a plug-in for an application, as a library function or functions, as a server device, and/or as a cloud-computing system. A digital medium environment allows the conflict resolution system to perform digital asset management, synchronization, and conflict resolution between and across computing devices.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Instead, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In addition, as used herein, the term "cloud computing environment" refers to an environment in which cloud computing is employed.

Figure 11:
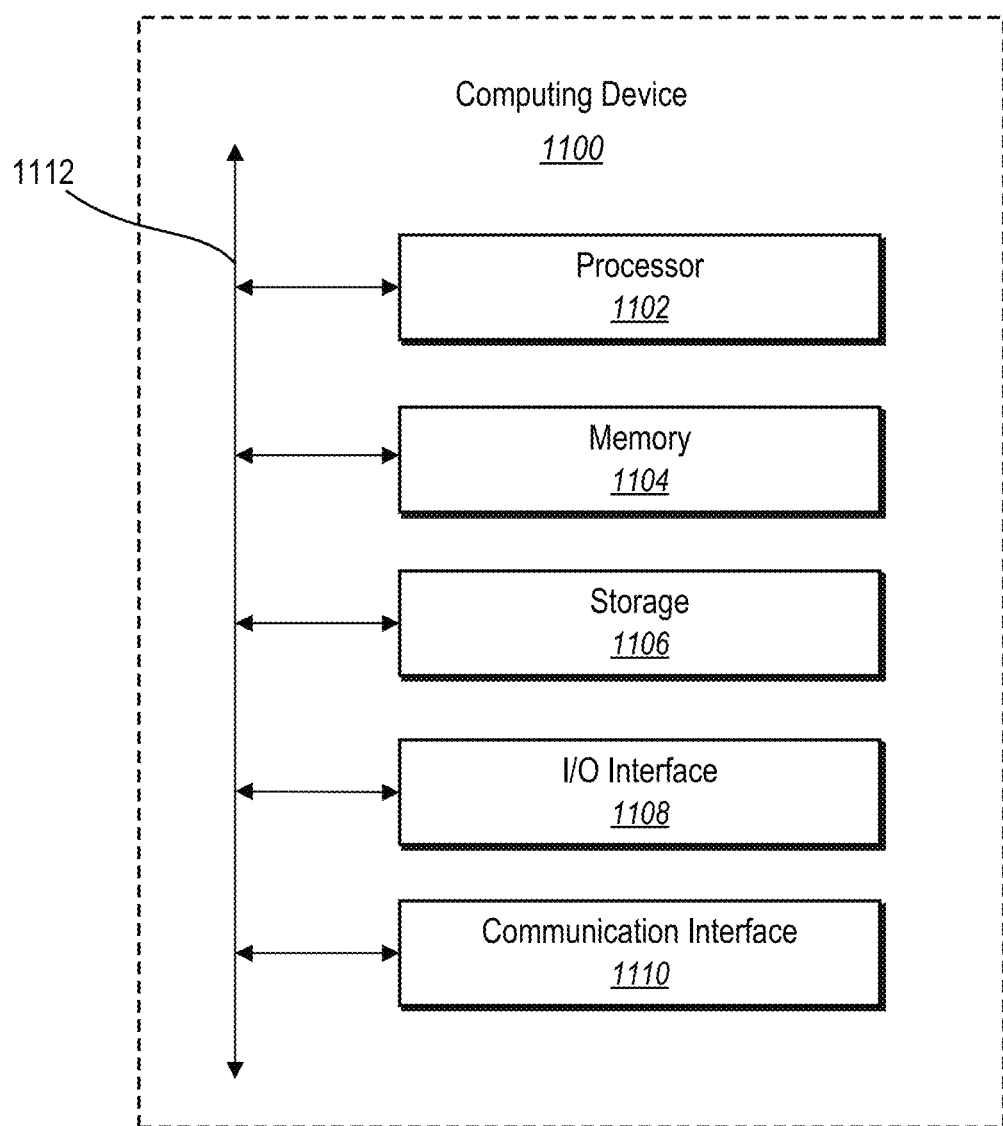
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 700, client devices 300, 802, or server devices 301, 804). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of the I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in different orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
    maintain a digital asset comprising a first composite part and a second composite part;
    identify a first modified version of the digital asset comprising the second composite part and a first modified version of the first composite part;
    identify a second modified version of the digital asset comprising the second composite part and a second modified version of the first composite part;
    determine a conflict between the first modified version of the first composite part and the second modified version of the first composite part;
    access a plurality of format-specific rule sets, wherein format-specific rule sets in the plurality of format-specific rule sets each comprises:
        a first portion comprising a media type designating the format-specific rule set to one or more particular composite part media formats, the first portion being separate from a plurality of format-specific rules included in the format-specific rule set;
        a second portion comprising the plurality of format-specific rules that each addresses conflicts with composite parts having the media type of the format-specific rule set designated in the first portion; and
        a third portion comprising rule exceptions that apply to the plurality of format-specific rules within the format-specific rule set;
    identify, based on determining the conflict, a media format of the first composite part;
    determine, based on analyzing media type designations within the first portion of each format-specific rule set, a format-specific rule set from the plurality of format-specific rule sets having a media type that matches the media format of the first composite part;
    resolve the conflict between the first modified version of the digital asset and the second modified version of the digital asset based on executing one or more format-specific rules in the format-specific rule set on the conflicting versions of the first composite part to generate a resolved version of the first composite part while preserving other composite parts of the digital asset; and provide, upon resolving the conflict, the resolved version of the first composite part to a remote device to replace the first composite part within the digital asset.

2. The non-transitory computer-readable medium of claim 1, wherein the first portion comprises a header that includes the media type designating the format-specific rule set to the one or more particular composite part media formats corresponding to the plurality of format-specific rules in the rule set, a name of the format-specific rule set, and a version of the format-specific rule set.

3. The non-transitory computer-readable medium of claim 1, wherein:
the digital asset is associated with a first application on a client device; and
resolving the conflict between the first modified version of the digital asset and the second modified version of the digital asset occurs on the client device independent from the first application.

4. The non-transitory computer-readable medium of claim 1, wherein:
the digital asset is associated with a first application on a client device; and
resolving the conflict between the first modified version of the digital asset and the second modified version of the digital asset occurs on a server device without use of the first application.

5. The non-transitory computer-readable medium of claim 4, wherein the instructions cause the computer system to resolve the conflict between the first modified version of the digital asset and the second modified version of the digital asset based on executing the one or more format-specific rules in the format-specific rule set by modifying content within the first composite part in accordance with a resolution action specified in the format-specific rule set to render the digital asset parsable by the first application.

6. The non-transitory computer-readable medium of claim 1, wherein the first portion comprises a header including the media type designating the format-specific rule set to the one or more particular composite part media formats.

7. The non-transitory computer-readable medium of claim 1, further comprising instructions that cause the computer system to:
identify overlapping rules between a first format-specific rule set and the second format-specific rule set that are each compatible with the media format of the first composite part;
determine that a rule in the first format-specific rule set has a greater media type specificity than an overlapping rule in the second format-specific rule set; and
update, based on the specificity determination, the first composite part based on the rule in the first format-specific rule set while bypassing the overlapping rule in the second format-specific rule set.

8. The non-transitory computer-readable medium of claim 1, wherein the instructions cause the computer system to resolve the conflict between the first modified version of the digital asset and the second modified version of the digital asset based on executing the one or more format-specific rules in the format-specific rule set annotating the resolved version of the first composite part to indicate a conflict resolution to a user who next accesses the digital asset having the resolved version of the first composite part.

9. The non-transitory computer-readable medium of claim 1, wherein the digital asset further comprises a manifest indicating composite parts comprising properties and components of the digital asset, wherein the first composite part is a first component, and wherein the second composite part is a second component.

10. The non-transitory computer-readable medium of claim 1, wherein the instructions cause the computer system to resolve the conflict between the first modified version of the digital asset and the second modified version of the digital asset by:
determining that the one or more format-specific rules, in the format-specific rule set that is compatible with the media format of the first composite part, does not resolve the conflict; and
propagating the conflict to a parent rule, in the format-specific rule set, to resolve the conflict.

11. The non-transitory computer-readable medium of claim 10, wherein the instructions cause the computer system to resolve the conflict between the first modified version of the digital asset and the second modified version of the digital asset by applying the parent rule and forking the first modified version of the digital asset and the second modified version of the digital asset into two separate composite parts within the digital asset.

12. A system for providing performing composite conflict resolution within digital assets, the system comprising:
one or more computer-readable memories comprising:
a digital asset comprising a first composite part and a second composite part; and
a plurality of format-specific rules sets comprising format-specific rule sets that each comprises:
a plurality of format-specific rules; and
a media type specifying at least one composite part media format to which the plurality of format-specific rules in the format-specific rule set corresponds, the media type being listed apart from the plurality of format-specific rules within the format-specific rule set; and
rule exceptions that apply to the plurality of format-specific rules within the format-specific rule set; and
a computing device storing instructions thereon that, when executed by the computing device, cause the system to:
identify a first modified version of the first composite part and a second modified version of the first composite part of the digital asset;
detect a conflict between the first modified version of the first composite part and the second modified version of the first composite part of the digital asset;
identify a media format of the first composite part of the digital asset;
determine a format-specific rule set from the plurality of format-specific rule sets having a media type that matches the media format of the first composite part;
update the digital asset by resolving the conflict between the first modified version of the first composite part and the second modified version of the first composite part based on the format-specific rule set without modifying other composite parts of the digital asset; and
provide, upon resolving the conflict, the updated digital asset to a client device.

13. The system of claim 12, wherein the first modified version of the first composite part and the second modified version of the first composite part share a same composite part identifier and a same composite part path with the first composite part.

14. The system of claim 12, wherein the instructions cause the system to:
- identify the first modified version of the first composite part and the second modified version of the first composite part of the digital asset by traversing a first manifest of a first version of the digital asset and a second manifest of a second version of the digital asset; and
- detect the conflict between the first modified version of the first composite part and the second modified version of the first composite part of the digital asset by comparing the first and second manifests node-by-node and composite part by composite part to identify that the first composite part in the first manifest differs from the first composite part in the second manifest.

15. The system of claim 14, wherein the instructions cause the system to resolve the conflict between the first modified version of the digital asset and the second modified version of the digital asset based on the format-specific rule set by:
- accessing a selector clause in the format-specific rule set that indicates which portion of the manifest of the first asset the format-specific rule set applies; and
- determining that a trigger clause in the format-specific rule set indicates that the format-specific rule set should be applied.

16. The system of claim 15, wherein the instructions cause the system to resolve the conflict between the first modified version of the digital asset and the second modified version of the digital asset based on the format-specific rule set by accessing an action clause in the format-specific rule set and merging the first modified version of the first composite part and the second modified version of the first composite part in accordance with the action clause.

17. The system of claim 12, wherein:
- the instructions cause the system to update the digital asset by resolving the conflict between the first modified version of the digital asset and the second modified version of the digital asset based on the format-specific rule set utilizing a software-agnostic process; and
- the software-agnostic process occurs at a server device during synchronization of the digital asset with the client device that provides the first modified version of the first composite part.

18. The system of claim 12, wherein the digital asset comprises one or more composite parts having different media formats.

19. In a digital medium environment for performing digital asset management of composite files, a computer-implemented method for resolving composite-part conflicts within digital assets, the computer-implemented method comprising:
- maintaining a digital asset comprising a first composite part and a second composite part;
- identifying a first modified version of the first composite part modified by a first source;
- identifying a second modified version of the first composite part modified by a second source;
- determining a conflict between the first modified version of the first composite part and the second modified version of the first composite part;
- accessing a plurality of format-specific rule sets, wherein one or more format-specific rule sets in the plurality of format-specific rule sets each comprises:
  - a first portion comprising a media type designating the format-specific rule set to one or more particular composite part media formats, the first portion being separate from a plurality of format-specific rules included in the format-specific rule set;
  - a second portion comprising the plurality of format-specific rules that each addresses conflicts with composite parts having the media type of the format-specific rule set designated in the first portion; and
  - a third portion comprising rule exceptions that apply to the plurality of format-specific rules within the format-specific rule set;
- identifying, based on determining the conflict, a media format of the first composite part;
- determining, based on analyzing the first portion of each format-specific rule set, a format-specific rule set from the plurality of format-specific rule sets having a media type that matches the media format of the first composite part;
- resolving the conflict between the first modified version of the digital asset and the second modified version of the digital asset based on executing one or more format-specific rules in the format-specific rule set on the conflicting versions of the first composite part to generate a resolved version of the first composite part while preserving other composite parts of the digital asset; and
- providing the resolved digital asset to the first source and the second source.

20. The computer-implemented method of claim 19, wherein the first portion comprises a header that includes the media type designating the format-specific rule set to the composite part media format, a name of the format-specific rule set, and a version of the format-specific rule set.

* * * * *